United States Patent [19]
Douglas et al.

[11] Patent Number: 5,648,926
[45] Date of Patent: Jul. 15, 1997

[54] SILICON NEURON

[75] Inventors: Rodney James Douglas; Michelle Anne Mahowald, both of Oxford, United Kingdom

[73] Assignee: Medical Research Council, London, England

[21] Appl. No.: 211,956

[22] PCT Filed: Nov. 5, 1992

[86] PCT No.: PCT/GB92/02043

§ 371 Date: Oct. 13, 1994

§ 102(e) Date: Oct. 13, 1994

[87] PCT Pub. No.: WO93/09513

PCT Pub. Date: May 13, 1993

[30] Foreign Application Priority Data

Nov. 6, 1991 [GB] United Kingdom .............. 9123583

[51] Int. Cl.$^6$ ........................................... G06G 7/00
[52] U.S. Cl. ..................... 364/807; 395/24; 326/36
[58] Field of Search ................. 364/807; 395/24; 326/36

[56] References Cited

U.S. PATENT DOCUMENTS

| | | | |
|---|---|---|---|
| 4,935,702 | 6/1990 | Mead et al. | 330/9 |
| 5,004,932 | 4/1991 | Nejime | 307/201 |
| 5,021,988 | 6/1991 | Mashiko | 364/807 |
| 5,350,953 | 9/1994 | Swenson et al. | 364/807 |
| 5,394,511 | 2/1995 | Mashiko | 364/807 |

OTHER PUBLICATIONS

Hodgkin et al., *A Quantitative Description of Membrane Current and its Application to Conduction and Excitation in Nerve*, J. Physiol., 1952, vol. 117, pp. 500–544.

Hopfield, Neural Networks and Physical Systems with Emergent Collective Computational Abilities, Proc. Natl. Acad. Sci. USA 1982, vol. 79, pp. 2554–2558.

Mead, Analog VLSI and Neural Systems, Addison–Wesley, 1989, pp. 101–124 147–162.

M. Mahowald et al., "A Silicon Neuron", Letters To Nature, vol. 354, Dec. 1991, pp. 515–518.

S.W. Tsay et al., "CMOS Realization of a Class of Hartline Neural Pools", 1990 IEEE International Symposium on Circuits and Systems, vol. 3, May 1990, pp. 2417–2420.

N. El–Leithy et al., "A Basic MOS Neural Type Junction, A Perspective on Neural–Type Microsystems", IEEE First International Conference on Neural Networks, vol. 3, Jun. 1987, pp. 469–477.

M. Maher et al., "Implementing Neural Architectures Using Analog VLSI Circuits", IEEE Transactions on Circuits and Systems, vol. 36, No. 5, May 1989, pp. 643–652.

*Primary Examiner*—Tan V. Mai
*Attorney, Agent, or Firm*—Foley & Lardner

[57] ABSTRACT

An integrated circuit having a plurality of interdependent differential pairs of CMOS transistors emulates the functional characteristics of a biological neuron. The gate voltage of a first one of each pair of transistors is settable to a threshold value corresponding to an activation threshold of an ion channel in the biological neuron and the gate of a second one of each pair of transistors is representative of an incoming membrane potential, ligand concentration or ion concentration of the biological neuron. Each differential pair of CMOS transistors provides a sigmoidal output representative of an ionic conductance across a neuron membrane when the gate voltage of the second transistor exceeds the threshold value set by the gate voltage of the first transistor.

16 Claims, 18 Drawing Sheets

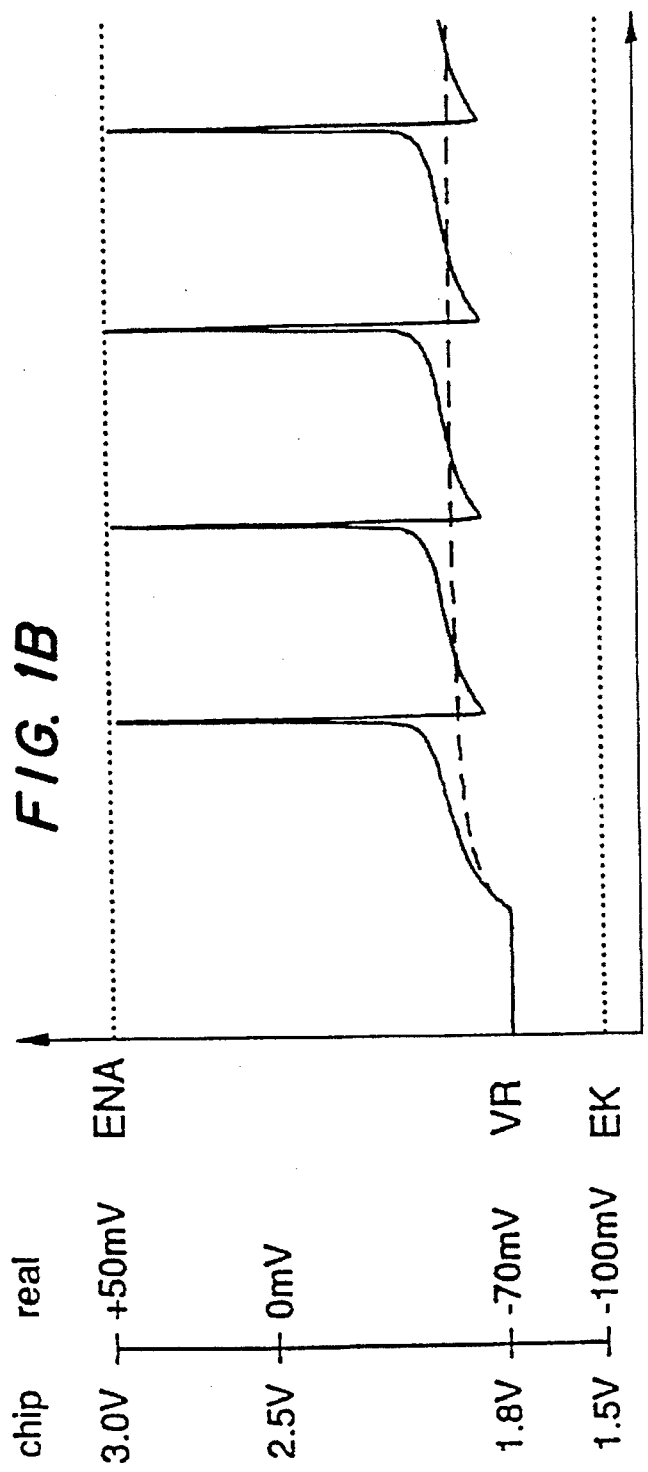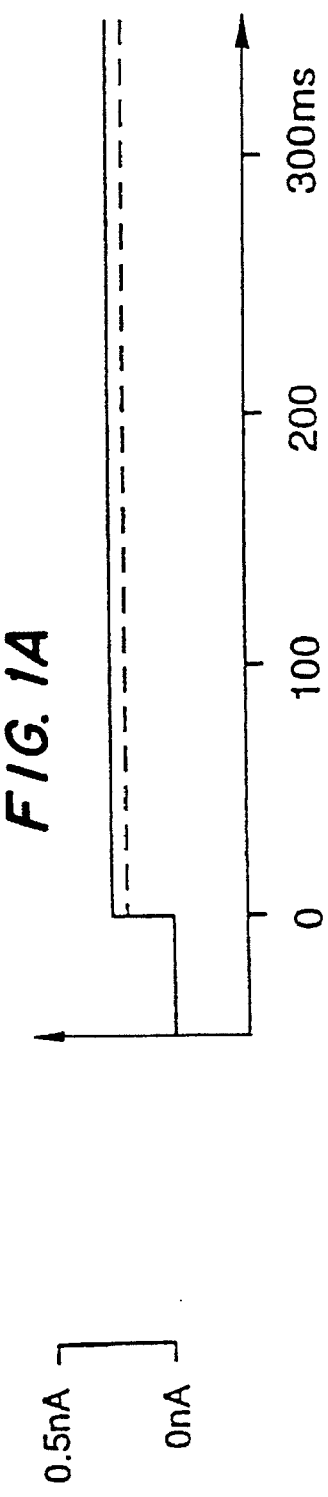

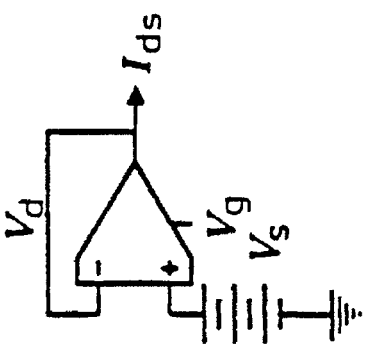
FIG. 4A
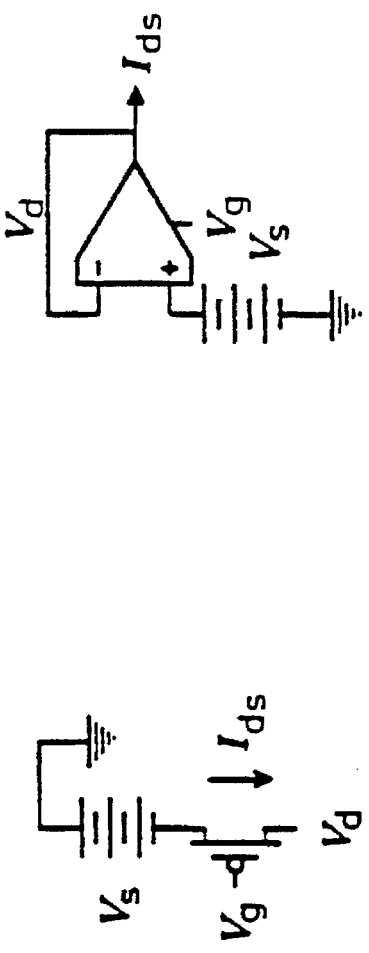
FIG. 4B
FIG. 4C
FIG. 4D
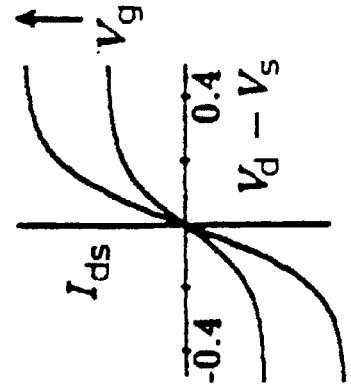
FIG. 4E
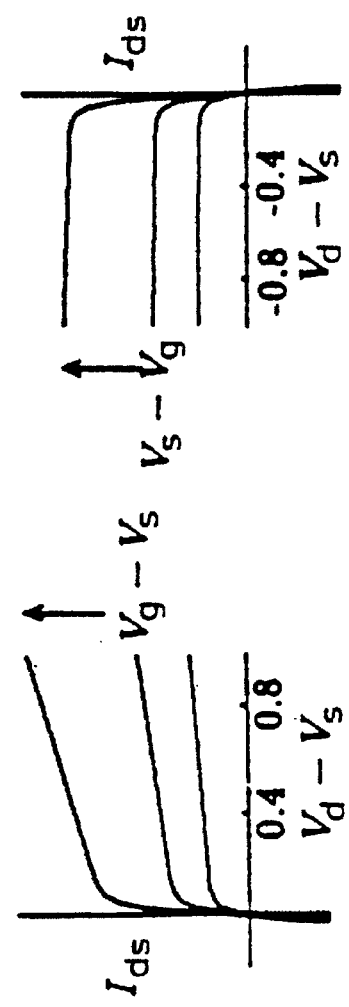
FIG. 4F

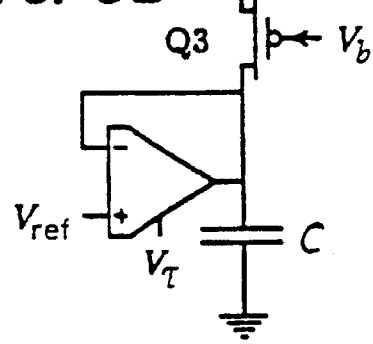
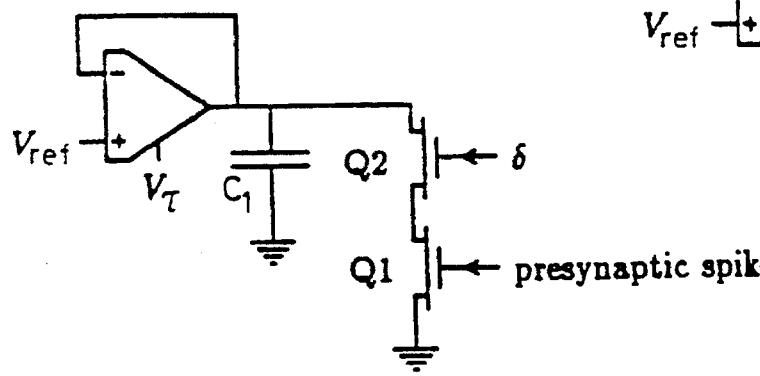
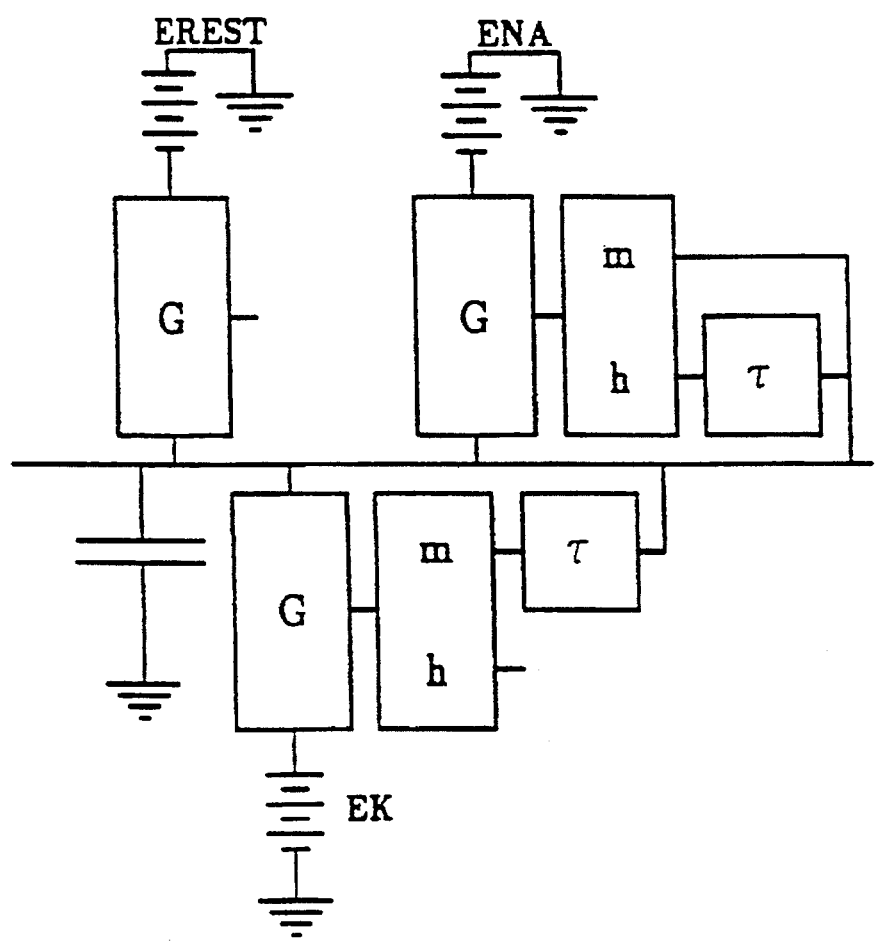

$$m = gmax * (1-h) \left( \frac{e^{\kappa V_{on}}}{e^{\kappa V_{on}} + e^{\kappa onknee}} \right)$$

$$g = (m - h)$$

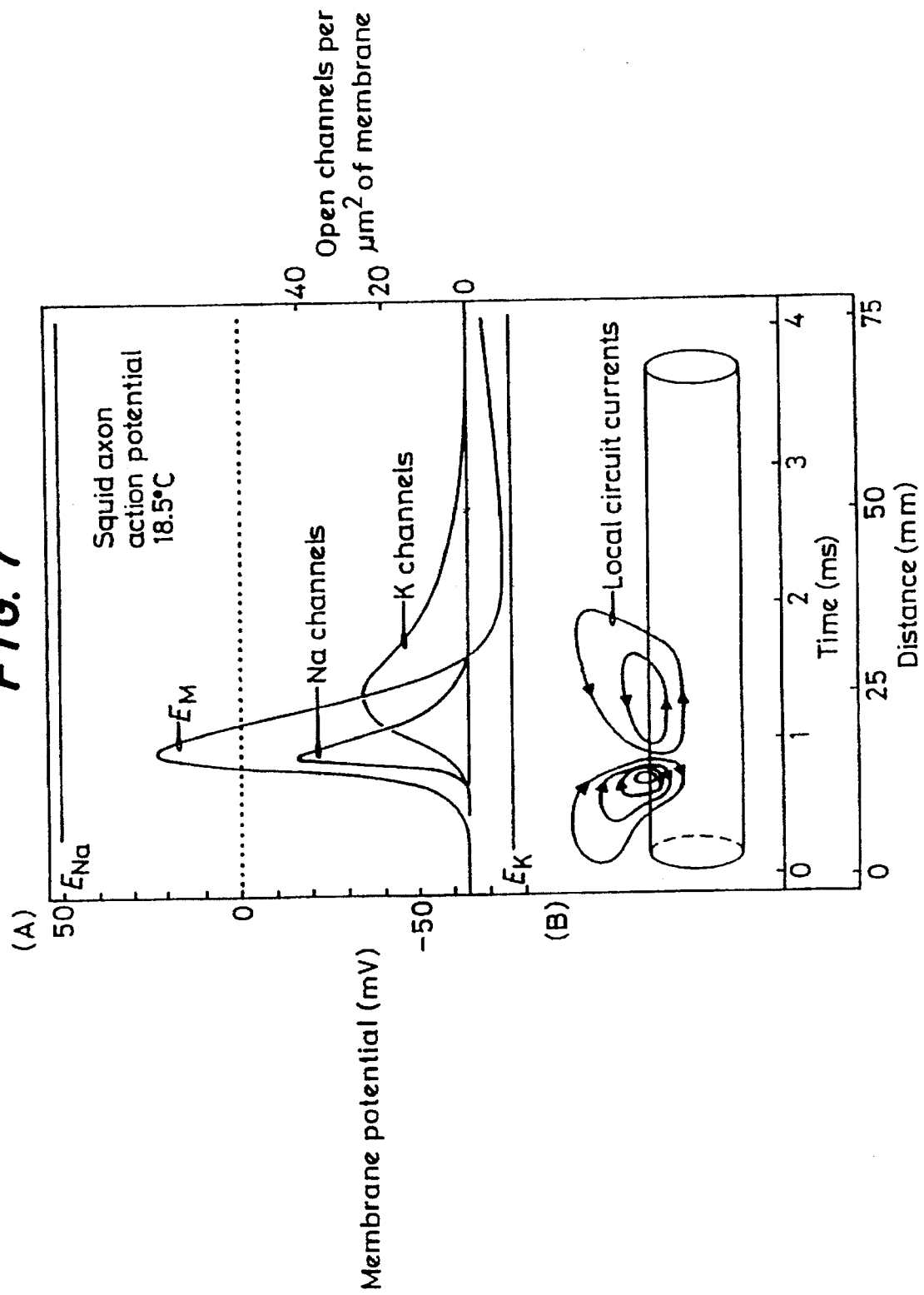

Silicon

Real

FIG. 20B $V_{out}, V_b = 0.65$
FIG. 20C $V_{out}, V_b = 0.6$

SILICON NEURON

The present invention relates to an electronic instantiation of a biological neuron and, in particular, to an integrated circuit that emulates a biological neuron in real-time (or faster).

It is well known that biological neurons occurring in nervous systems of animals are cells delimited by an enclosing cell membrane that in its various regions is recognised as the cell body (or soma), a number of branching dendrites and an axon. The computational properties of the neurons are intimately linked to the controlled flow of ions across the cell membrane and the subsequent flow of ions within the cell. The dendrites collect information from axons of other neurons, via synapses (or contacts) between the dendrites and axons, and pass the information to the cell body. Each neuron is in contact with thousands of other neurons via the dendrite/axon interactions. The dendrites pass the collected information to the cell body.

In its resting or polarized state, the inside of a region of membrane fluctuates about a voltage of approximately −70 mV with respect to the outside of the membrane. The voltage fluctuation is due to the continual flux of various ions, in particular sodium and potassium ions, into and out of the cell via membrane conductances. These ionic conductances of the cell membrane are voltage- ion- and ligand-sensitive. These ionic conductances are responsive to the state of the local membrane and in turn affect the state of the local membrane. For example, some regions of membrane contain voltage-sensitive conductances that act to amplify the current flowing across the membrane. This current propagates from the local region to nearby regions of membrane affecting its polarization. The most extensively studied example of this phenomenon is the generation of an action potential.

If the stimuli fed by the dendrites to the cell body are such that the voltage difference between the inside and the outside of the membrane depolarizes past a threshold of approximately −50 mV, an avalanche effect occurs as more and more positively charged ions enter the membrane. This results in the voltage of the inside of the membrane shifting past zero to approximately +50 mV. As this occurs, an action potential (nerve impulse) is initiated, which lasts about 1 millisecond.

FIG. 1a shows an intrasomatic current injection into a neuron and FIG. 1b shows the resulting change in membrane potential of the neuron. As can be seen, if a subthreshold current stimulus of 0.20 nA (broken line) is entered, a simple charging response (broken line in FIG. 1b) of the membrane results. On the contrary, if a higher, suprathreshold stimulus of 0.26 nA is entered into the neuron, a discharge action potential spike occurs. In this regard, the peak of the spike approaches the equilibrium potential for sodium ENA.

As the action potential travels from one point on the membrane to the next, the previous point becomes repolarised—i.e. its resting voltage is restored. Repolarisation results from a change in the membrane permeability to certain ions, such as potassium, which move from inside the membrane to outside. In this way, the voltage inside of the membrane reverts back to its resting voltage of approximately −70 mV.

As the action potential propagates along the membrane, in particular down the axon, the signal is transmitted to any other neuron having a dendrite in contact with the axon through which the nerve impulse is passing. The contact is usually via a synapse, a structure at which the axon is closely opposed to the dendrite of its target cell.

In practice, the synapses release chemicals when activated which affect the postsynaptic membrane permeability to certain ions, thereby causing the membrane voltage to change. Each synapse contributes either to the hyperpolarisation or the depolarisation of the neuron membrane as a whole. However, if the depolarisation is large enough, and the threshold voltage is passed (as mentioned above), the avalanche effect occurs and an action potential is produced. Since this action potential is repeatedly produced along the neuron, the signal is continually restored and is therefore resistant to ambient noise. Also, repeatedly producing the complete restoration of the signal prevents the signal attenuating with distance.

Hodgkin, A. L. and Huxley A. F. in J. Physiol. (London), 117, 500–544 (1952) provide an analysis of the action potential in neurons. In their mathematical model, voltage- and time-dependent activation and inactivation processes combine to control the conductance of the membrane for a particular ion. The ion current flows across this conductance down the voltage gradient between the membrane voltage and the ionic equilibrium potential.

Theorists have shown that useful computational properties arise in networks of simplified neuron-like elements (c.f. Hopfield, J. J. proc. NATL. ACAD. SCI. U.S.A., 79, 2554–2558 (1982)). However, these networks are highly simplified abstractions of their biological counterparts. The characteristics of elements are chosen to preserve mathematical tractability, and so do not attempt to incorporate the impulsive and adaptive characteristics that are major characteristics of real neurons. Engineers constructing network hardware have also neglected these features in favour of elements that have simple and standardised electronic behaviour.

Many efforts have been made to follow Hodgkin and Huxley and to provide true mathematical representations of the way in which a biological neuron functions. Some of these approaches have been made using digital computers, but all such models result in the computer having to calculate using various mathematical functions and are therefore much slower in producing an output than a biological neuron, particularly where large numbers of neurons must interact. In this regard it should be noted that any useful neuronal circuit is expected to comprise many thousands of neurons. Hence, a truly representative real-time version of a neuronal circuit cannot be produced by numerical simulation on existing digital computers.

An approach taken by some engineers has been to simplify the operation of the biological neuron by producing circuits based on conventional electronic principles. Typically, these circuits convert input signals into a continuous output voltage that corresponds to the discharge rate of the axon of the biological neuron. Such attempts have ignored the fact that biological neurons use an action potential, because (the engineers argue) hard wired circuits do not have problems with ambient noise or limits on the distance that a signal can be transmitted. Accordingly, the engineers solution is essentially simply to have a voltage signal input resulting in a voltage signal output, rather than a voltage signal input which is transferred into a frequency-dependent signal before being subsequently transferred back into a voltage signal output as in the biological case. In some cases digital pulse techniques have been used by engineers to signal the output of the neuron. However, in these cases the pulse is not achieved by analogy with real neurons, and the pulse is not designed to propagate sequentially along a communication channel (the axon) as it does in the biological case.

Another problem with existing electrical circuits designed to model biological neurons is their size due to the number of contacts which need to be made. As mentioned previously, biological neurons interact with thousands of neighbouring neurons and this number of densely interconnected neurons cannot currently be established on a single chip. Individual neurons that are limited to a single chip require time-multiplexing techniques to achieve high connectivity with neurons on other chips. Engineers who have favoured continuous outputs have relied on systems that frequently and continuously poll all these neuronal outputs. In contrast to this, if an action potential arrangement is used, as in the biological set-up, the occurrence of the action potential can be used as a significant event indicator which enables polling to be restricted to just those neurons displaying activity.

Unlike engineered networks, that conventionally rely on well specified and calibrated components, biological neural networks are subject to component variability and have no method of external calibration. It appears that neurons use computational strategies that minimize the effects of component variability. One such mechanism is adaptation of discharge—whereby the neuron responds strongly to novel stimuli, but less strongly to sustained inputs. These properties/strategies are not incorporated in engineered networks. If they were to be incorporated, they might lead to considerable reduction in cost, since components need not be manufactured to such high specifications.

Furthermore, by using adaptive mechanisms, biological neurons preserve sensitivity over a wide range of input intensities by maintaining the output of the neuron within its dynamic range. Such mechanisms also compensate for the inevitable mis-match in performance between neurons.

An example of an adaptive current is the calcium dependent potassium current, which operates as follows.

During each action potential of a biological neuron, calcium enters the cell via voltage sensitive calcium channels. The calcium is quickly buffered. However, if the discharge rate (of action potentials) is high, the entering calcium cannot be buffered sufficiently and the intracellular calcium concentration rises, activating a potassium current. This current opposes the excitatory current, causing spike frequency adaptations which prevent ambient noise from being a problem. This feature also is not mirrored in the engineered models known from the prior art.

The present invention has been developed to overcome the above-mentioned problems with the prior art. By using the principles of electrical behaviour and signal processing that is employed by biological neurons, the "silicon neuron" has (amongst other things) the impulsive and adaptive properties of real neurons. Furthermore, a "silicon neuron" as hereinafter described emulates the characteristics of a biological system directly in its device physics, rather than by modelling a mathematical abstraction. This permits greater efficiency in circuit construction and, as a result, enables the neuron to function in real-time at reduced cost.

In the light of the foregoing, the present invention provides an integrated circuit that emulates the behaviour of individual ion currents across neuronal membranes. The basic circuit and its modifications then provide the various combinations of ion currents that together give rise to the electrical properties of neurons that underlie their computational processes. A basic circuit that emulates individual ion currents consists of an integrated circuit comprising a plurality of differential pairs of CMOS transistors, the gate voltage of a first one of each pair of transistors being settable to set a threshold value corresponding to an activation threshold of an ion channel in a biological neuron and the gate voltage of the second one of each pair of transistors being representative of a membrane potential, ion concentration or ligand concentration of a biological neuron, each differential pair of CMOS transistors thereby providing a sigmoidal output representative of an ionic conductance across a neural membrane when the gate voltage of the second transistor exceeds the threshold value set by the gate voltage of the first transistor, wherein the plurality of differential pairs of CMOS transistors are interdependent and produce a combined output which emulates the functional characteristics of a biological neuron. Such an integrated circuit acts as the basis for a "silicon neuron" which emulates a biological neuron directly in its device physics, rather than by modelling a mathematical abstraction. In this regard, the similarity between the current-voltage relation of a differential pair of CMOS transistors and the sigmoidal conductance-voltage relation encountered in nerve cell channels is fundamental to the success of these silicon neurons. The output of the circuit is used to control a current injection transistor that supplies the appropriate transmembrane current.

Preferably the maximum sigmoidal output of a differential pair is dictated by the gate voltage of a third (bias) transistor between the differential pair and a reference voltage. This arrangement enables the peak ion current to be controlled so that it can make its appropriate contribution to the collection of ion currents that together imitate realistically the electrical behaviour of a biological neuron. The peak current influences the gain of the linear region of the sigmoid. This gain may be modified independently of the maximum conductance. One method is the introduction of diodes or other methods of source-degeneration to the differential pair.

Individual conductance control signals that arise from the differential pair control the gate voltage of a current injection transistor that is fabricated in such a way as to emphasize its ohmic behaviour. This transistor is interposed between the membrane voltage of the neuron and the ionic reversal potential. As such, it is the analog of the membrane conductance through which ionic current flows. Hence, as the sigmoidal output from the differential pair increases, the gate potential of this transistor changes and the ions move down an electrical gradient that is determined by the difference between ionic reversal potential and the prevailing membrane voltage.

In a further embodiment, the sigmoidal output from the differential pair is transformed into a gate potential for the conductance transistor via a current mirror.

The integrated circuit described so far is a general circuit for providing the activation (or turning on) of voltage-dependent conductances. By arranging for two such circuits to act antagonistically the ion currents can be made to activate, and inactivate, as seen in the biological case, thereby initiating and then terminating the injection of a given ion current. In a biological neuron, this would be equivalent to an ion conductance, which had passed a threshold value and increased, being reduced back to a quiescent state. Indeed, this is essentially what happens during an action potential with regard to sodium ions in a biological neuron, i.e. when a threshold potential is passed, the conductance of sodium ions through the neural membrane increases dramatically until it is reset due to the accumulating inactivation.

Preferably the incoming control voltage, representing membrane potential, ion concentration or ligand concentration, passes through a low-pass filter to control the temporal dynamics of conductance control outputs from the or each differential pair.

The low-pass filter preferably includes at least one, if not several, follower-integrators. These may be implemented with transconductance amplifiers or current-limited source-follower transistors (c.f. Mead, C., *Analog VLSI and Neural Systems* (Addison-Wesley, Reading, Massachusetts, 1989)). The low-pass filter may have variable time constants that set the dynamic behaviour of the activation and inactivation circuits. The adjustment of the time-constants of activation and inactivation, the maximum conductances and the gain of the conductances all contribute to shaping the dynamics of neuronal response.

Although an integrated circuit according to the present invention described above emulates the flow of particular ions and hence the change in potential produced thereby, it will of course be understood that an integrated circuit can be manufactured combining a plurality of such circuits. In this way, a more accurate representation of a true biological neuron can be built up.

It should further be understood that the various currents control only a limited region of the silicon neuron, and that complex geometries of inter-linked regions, resembling the anatomy of real neurons, can be constructed using the principles described here in conjunction with any resistance element having at least two terminals (c.f. Mead, C., *Analog VLSI and Neural Systems* (Addison-Wesley, Reading, Massachusetts, 1989)). Since the behaviour of the ionic conductances in each region of membrane is determined locally, the structure of the neuron, which sets the pattern of interaction between local regions, is a determining factor in the response of each region and, consequently, the neuron as a whole.

Furthermore, by using VLSI technology, many silicon neurons with complex geometry may be formed on a single silicon chip. This is because the individual circuits are very compact. The size of a typical silicon neuron will depend on the number of currents and anatomical detail that the manufacturer may desire. However, the unoptimized prototype described here occupies less than 0.1 mm$^2$.

As will be appreciated, the maximum speed at which an integrated circuit according to the present invention can function is determined by the limitations of the CMOS, and in principle the silicon neuron could operate about one million times faster than real neurons. However, in the preferred embodiments described herein the circuits function at the same speed as real neurons in order to match their dynamics to those of the real-time world.

Specific embodiments of the present invention are now described, by way of example only, with reference to the accompanying drawings, in which:

FIG. 1A shows a graphic representation of an intrasomatic current injection into a silicon neuron, which in this example contains only the ionic currents required for action potentials;

FIG. 1B is a graphic representation of an output (real data from a chip) of a silicon neuron in response to the input of FIG. 1a and demonstrates that the behaviour of the silicon neuron is very similar to that of real neurons;

FIGS. 4A–4F show inhibitory, excitatory and shunting conductance elements respectively whose magnitude is modulated by an activation voltage, $V_g$. The current/voltage relation of each element is shown for two (FIG. 4C) or three (FIGS. 4A and 4B) values of $V_g$ [—Simulation];

FIG. 5A shows a concentration circuit which calculates the transmitter concentration at a synapse. Transmitter accumulates on capacitor $C_1$ at a rate dependent on $\delta$ when a presynaptic action potentional is applied to Q1;

Figure 6A:
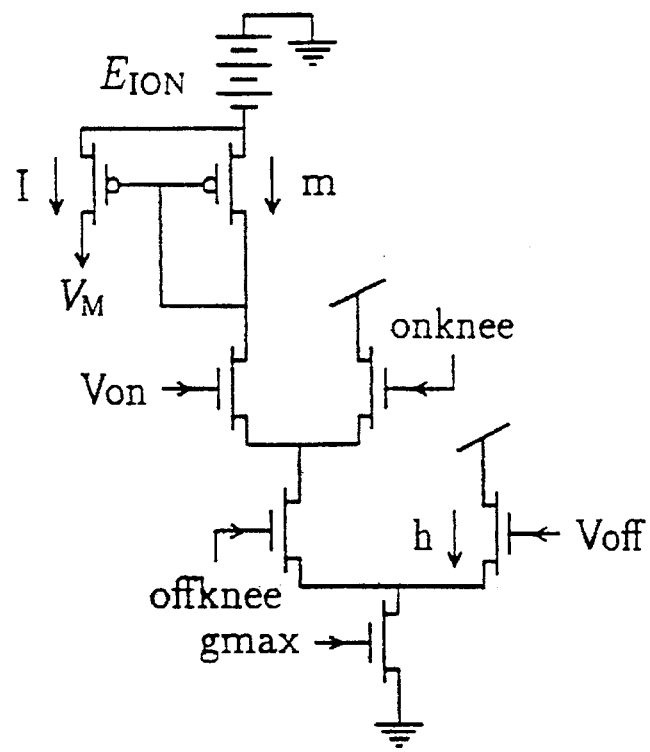
Figure 6B:
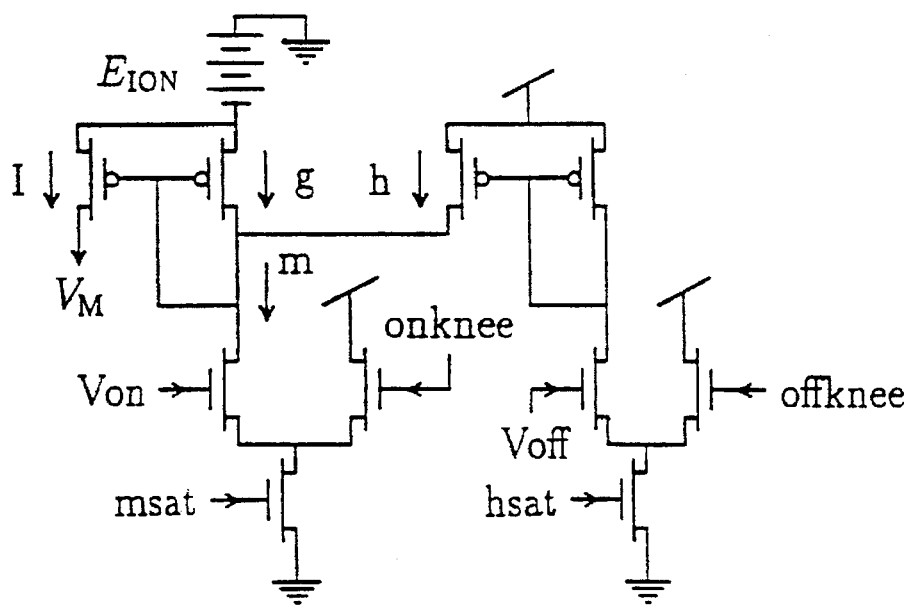
Figure 9:
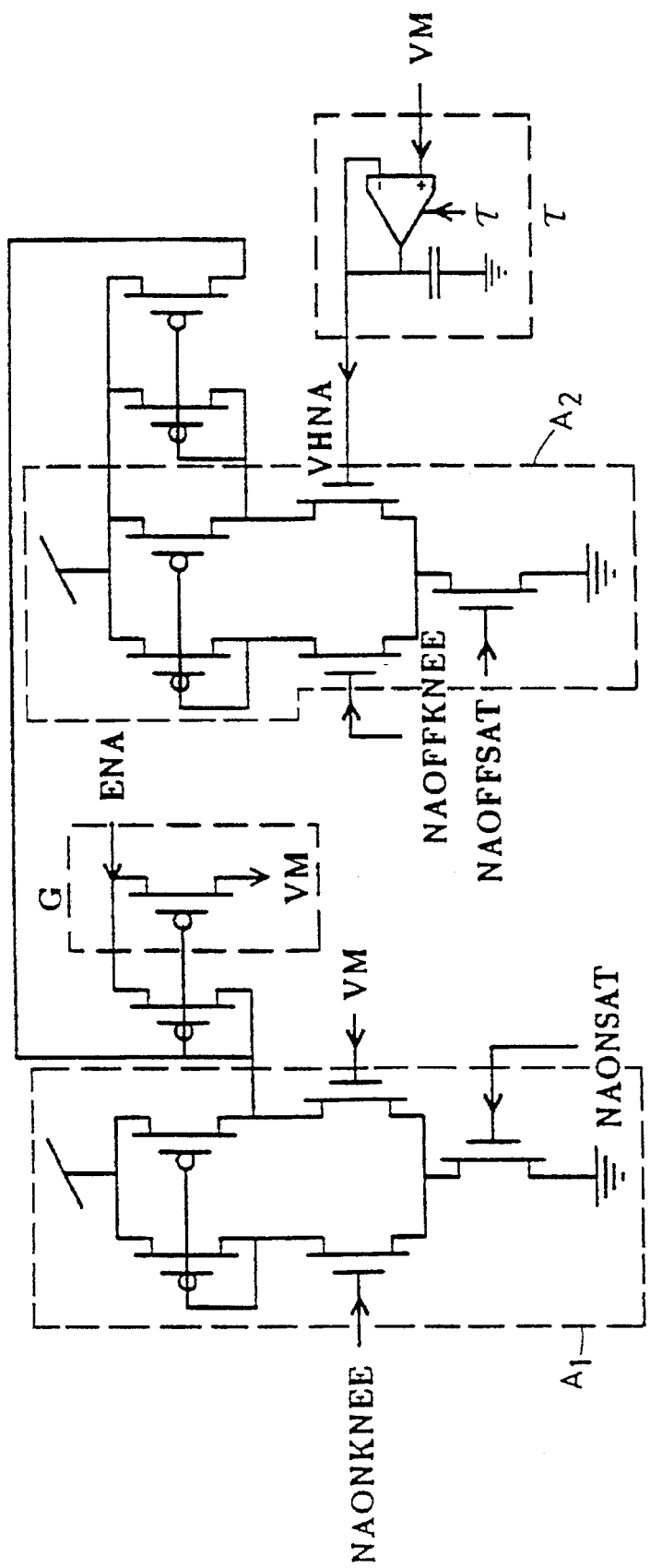
Figure 10:
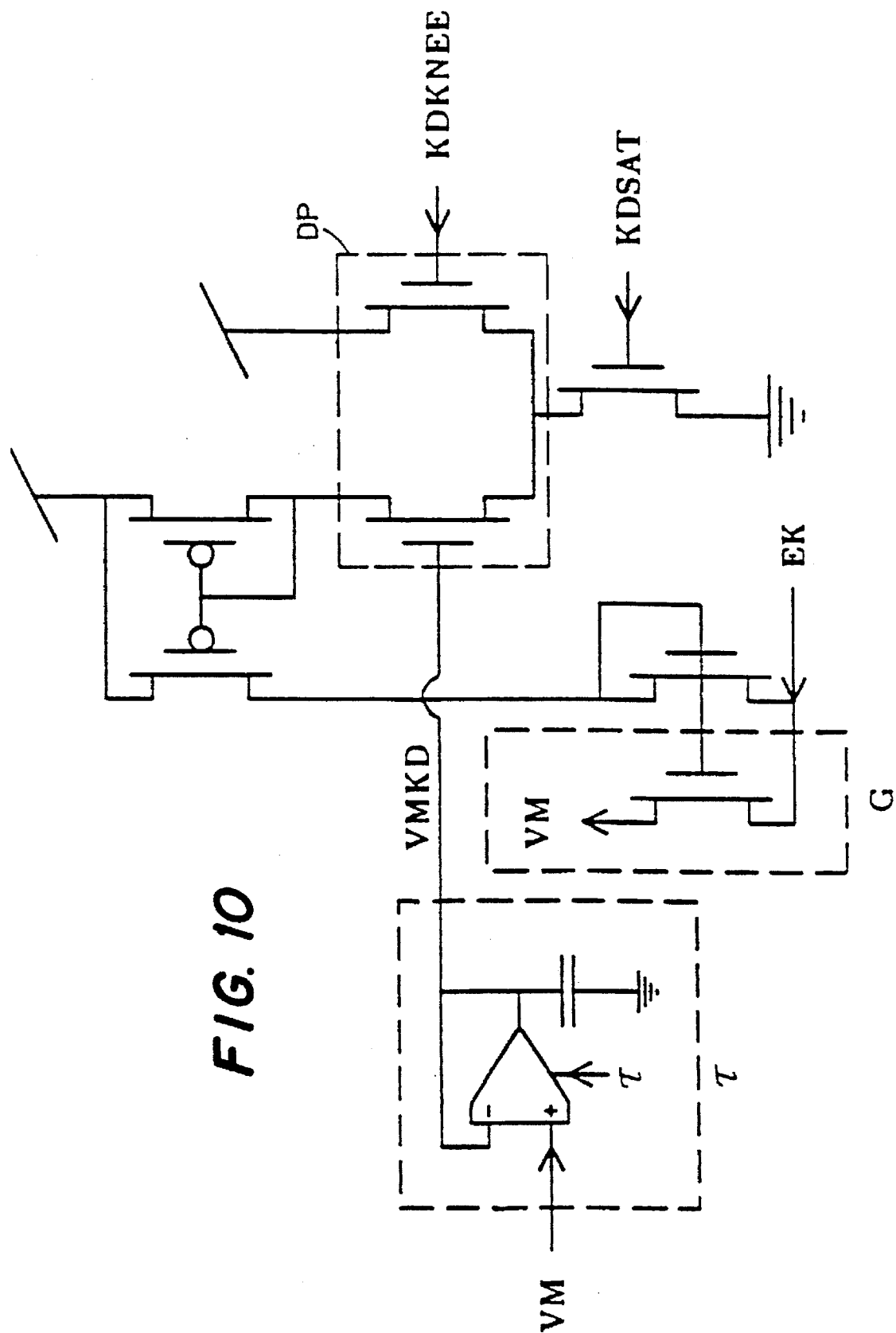
Figure 11:
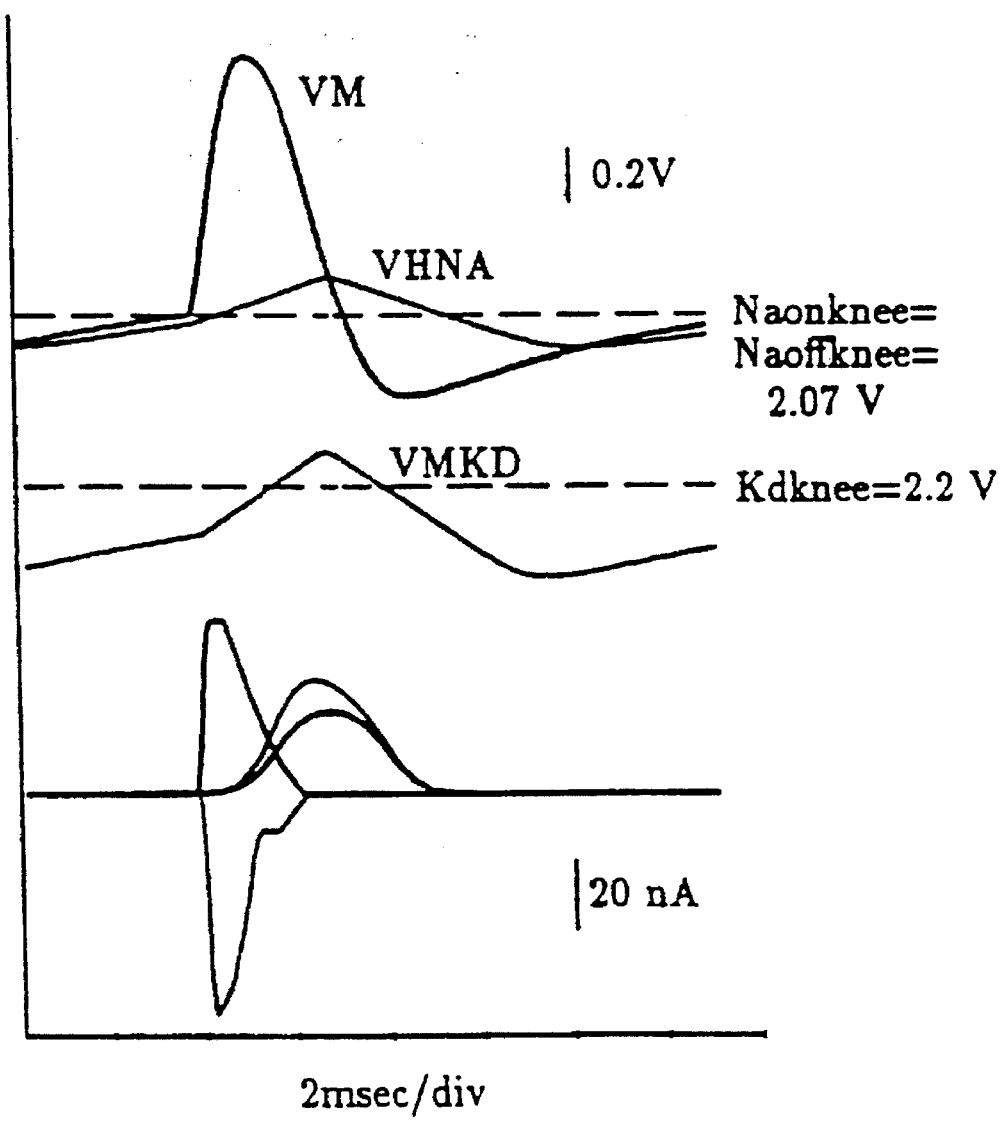
Figure 12:
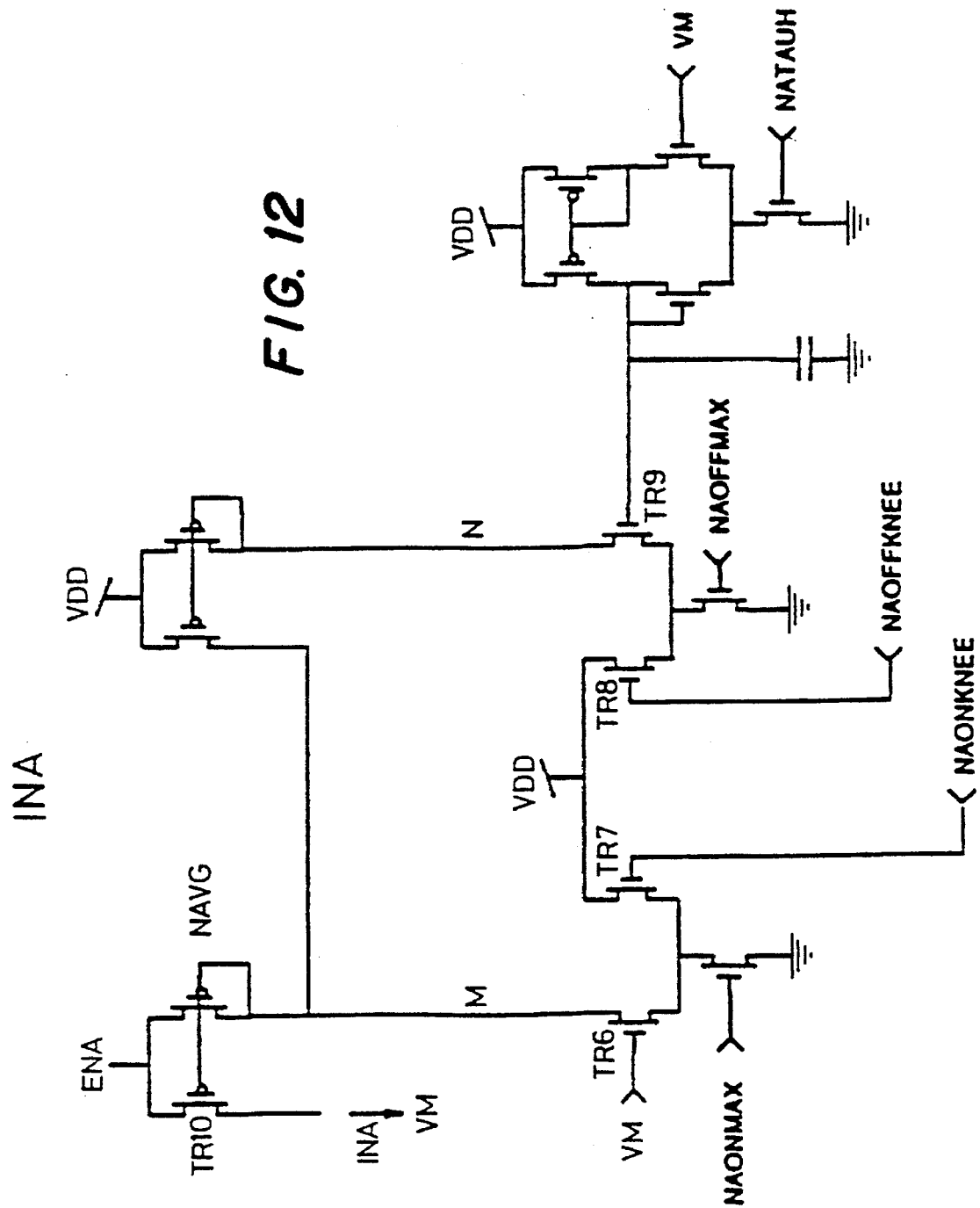
Figure 13:
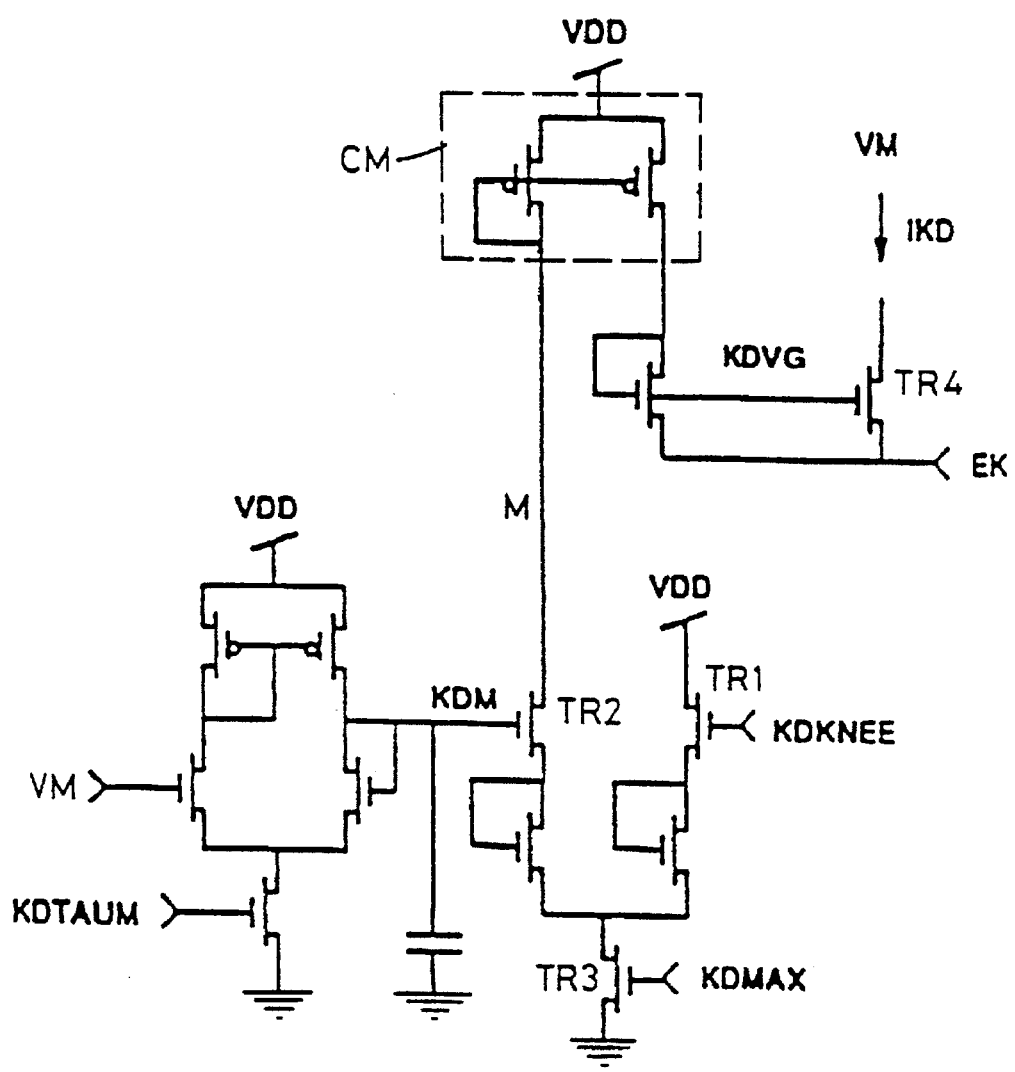
Figure 15A:
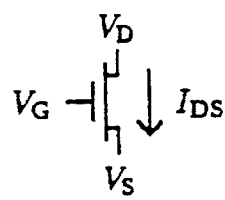
Figure 15B:
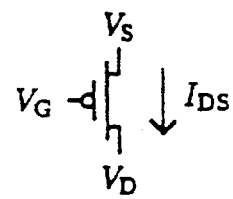
Figure 15C:
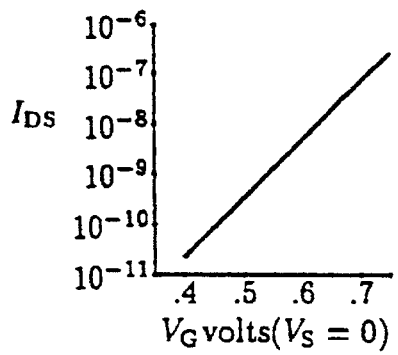
Figure 15D:
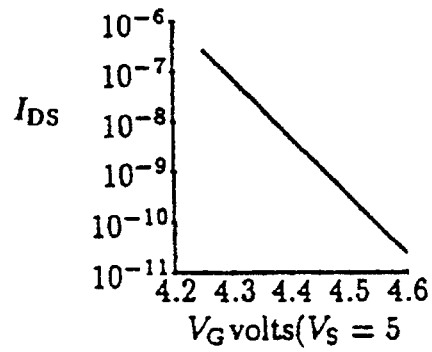
Figure 15E:
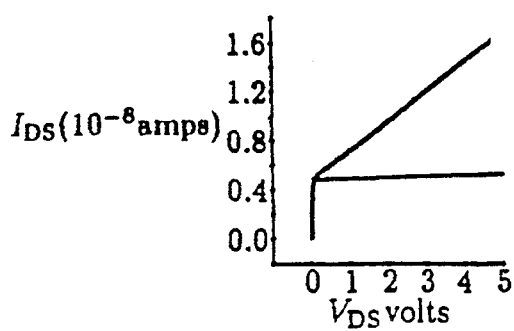
Figure 15F:
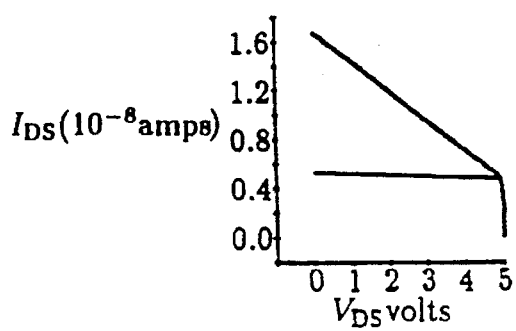

FIG. 5B shows a concentration circuit which calculates an ion concentration based on the activation of a voltage-sensitive ion conductance (not shown). The voltage-sensitive conductance activation/inactivation circuit that computes the ion current flowing across the membrane generates a voltage $V_b$ which is applied to the gate of transistor Q3. The source of transistor Q3 is tied to a control voltage that allows the current representing ion flux into the compartment to be scaled independently of the associated electrical current flowing into the cell;

FIG. 6A shows an activation/inactivation circuit wherein the degree of activation and the degree of inactivation are multiplied;

FIG. 6B shows an activation/inactivation circuit wherein the degree of activation and the degree of inactivation are subtracted;

FIG. 7 is taken from "Ionic Channels of Excitable Membranes", Second Edition, by Bertil Hille, published by Sinauer Associates Inc., Sunderland, Mass., 1992. The figure shows events during a propagated action potential. The two diagrams, FIGS. A and B, describe the time course of events at one point in an axon, which may equally well be thought of as an instantaneous "snapshot" of the spacial extent of an action potential. FIG. 7A relates to the action potential and underlying opening of sodium and potassium channels calculated from the Hodgkin and Huxley model at 18.5° C. FIG. 7B is a diagram of the local circuit current flows associated with propagation;

FIG. 8 is a block diagram of a simple silicon neuron with membrane capacitor, leakage conductance, voltage-sensitive sodium conductance and voltage-sensitive potassium conductance;

FIG. 9 is a detailed activation/inactivation circuit corresponding to the voltage-sensitive sodium conductance of FIG. 8;

FIG. 10 is a detailed activation/inactivation circuit corresponding to the voltage-sensitive potassium conductance of FIG. 8;

FIG. 11 shows the action potential generated by the dynamics of two channels, the sodium channel and the delayed rectifying potassium channel. The membrane voltage is plotted, as are the filtered versions of the membrane voltage that drive the action/inactivation circuits. The currents out of the sodium and potassium conductances are also plotted [—Simulation];

FIG. 12 is another version of sodium activation/inactivation circuit with lower (conductance/voltage) gain;

FIG. 13 is another version of potassium activation/inactivation circuit with lower (conductance/voltage) gain;

FIGS. 14A–14D show adaptation and current-discharge relations for a silicon neuron according to the present invention and a biological neuron respectively (—real data);

FIGS. 15A and 15B show schematic illustrations of a N-type and a P-type transistor respectively;

FIGS. 15C and 15D show the drain-source current as a function of gate voltage for each of the transistors of FIGS. 15A and 15B, respectively, with the magnitude of the drain-source equal to one volt [—Simulation];

FIGS. 15E and 15F show the drain-source current as a function of drain-source voltage for the transistors of FIGS.

Figure 16A:
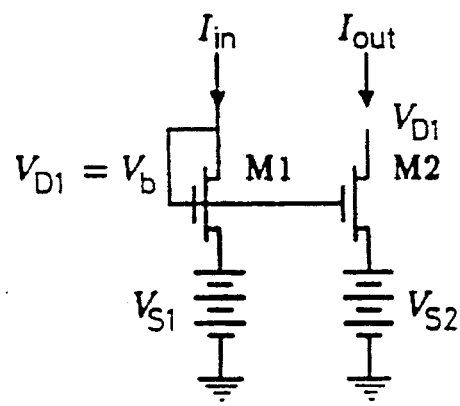
Figure 16B:
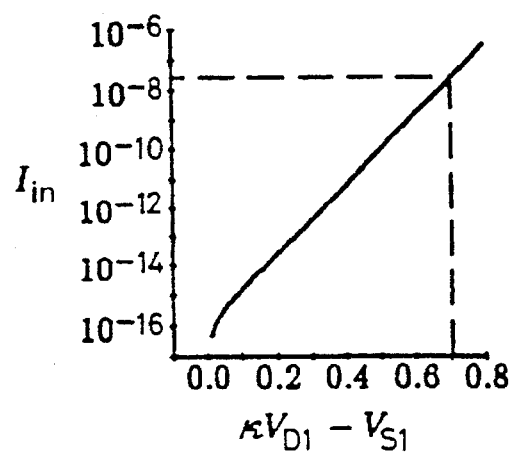
Figure 16C:
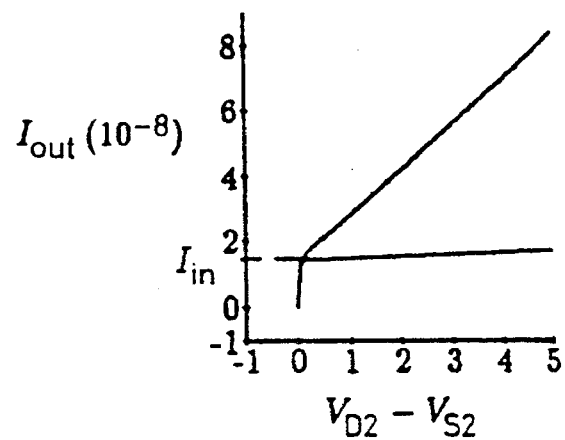
Figure 17A:
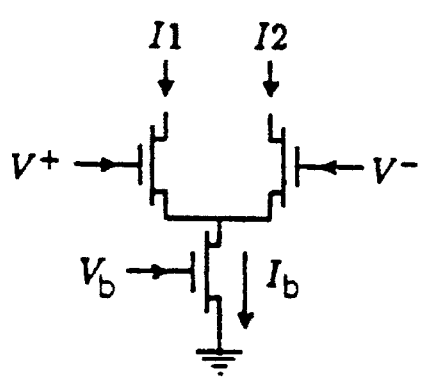
Figure 17B:
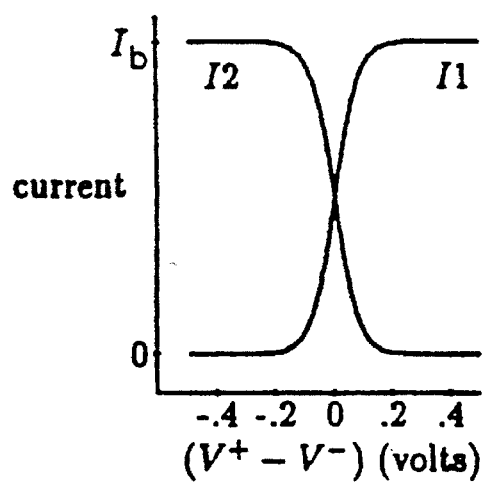
Figure 17C:
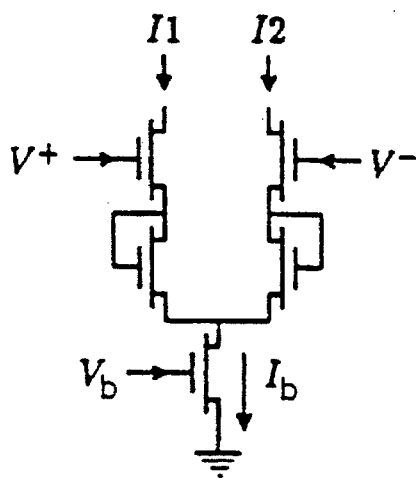
Figure 17D:
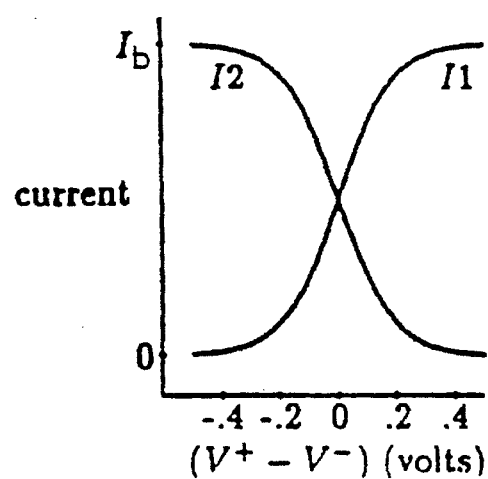
Figure 18A:
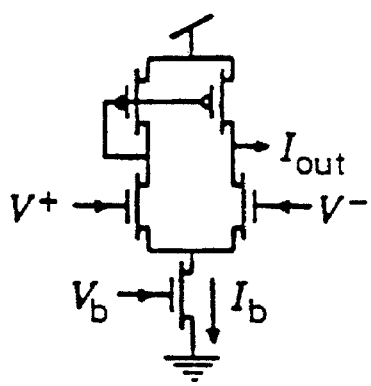
Figure 18B:
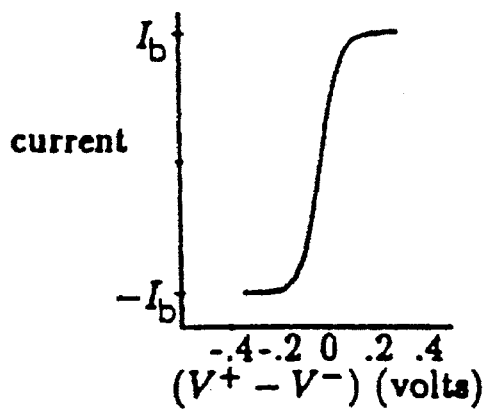
Figure 18C:
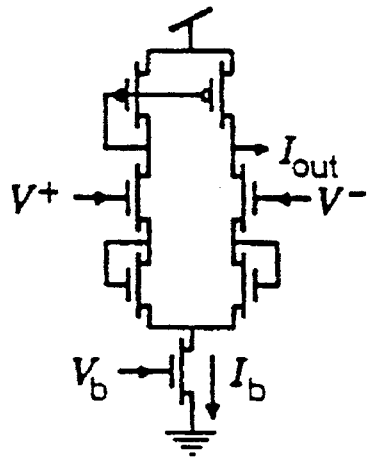
Figure 18D:
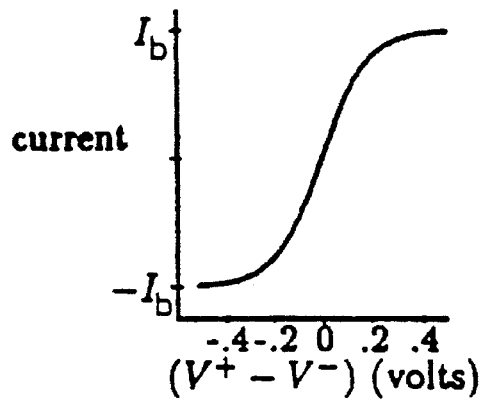
Figure 19B:
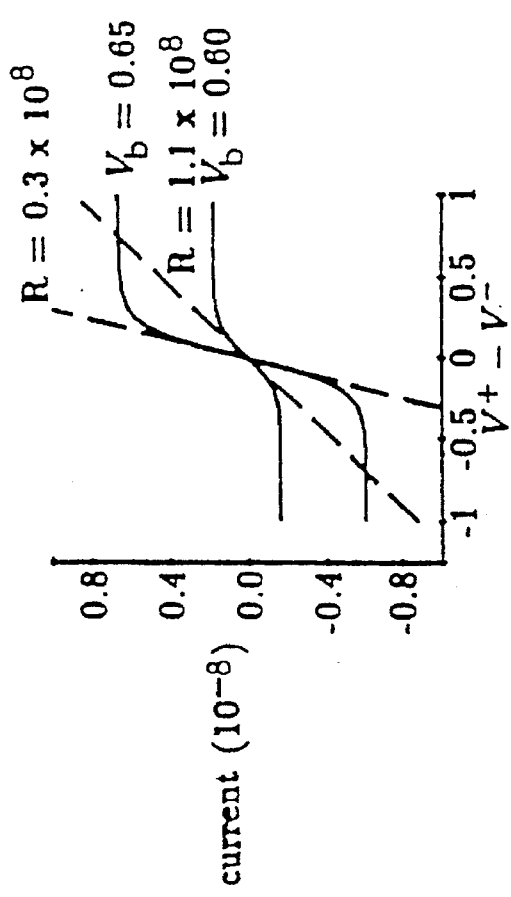
Figure 19A:
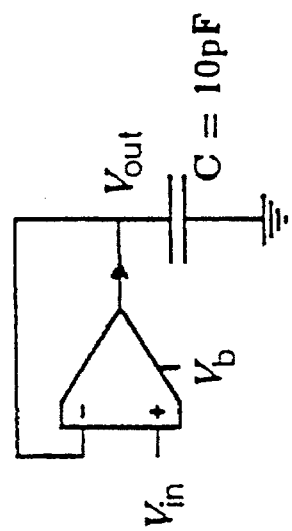
Figure 20A:
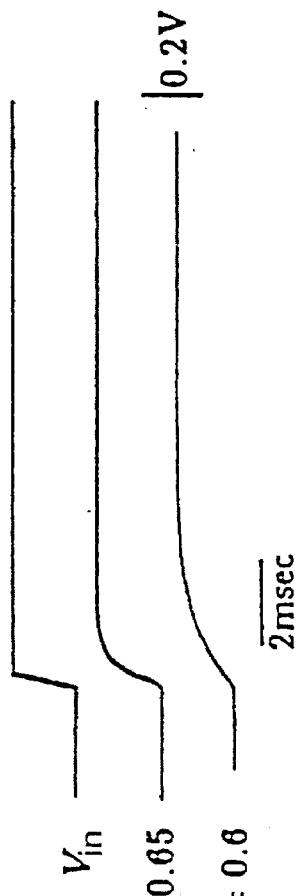
Figure 21A:
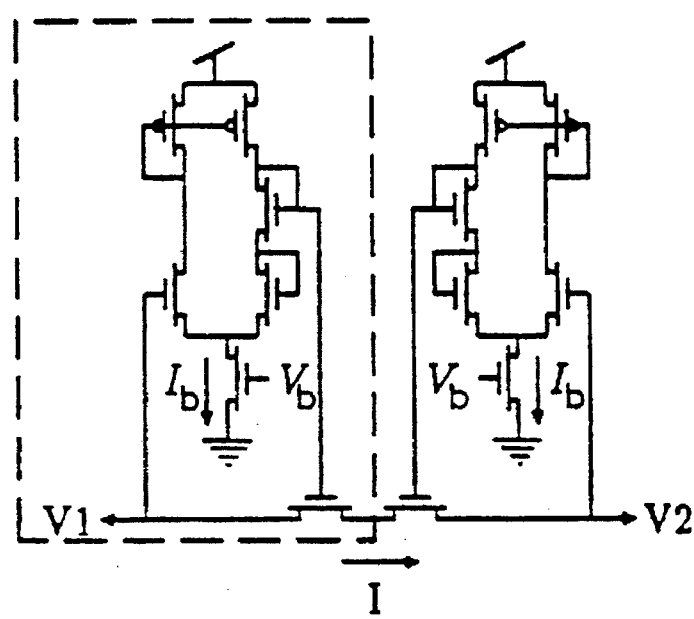
Figure 21B:
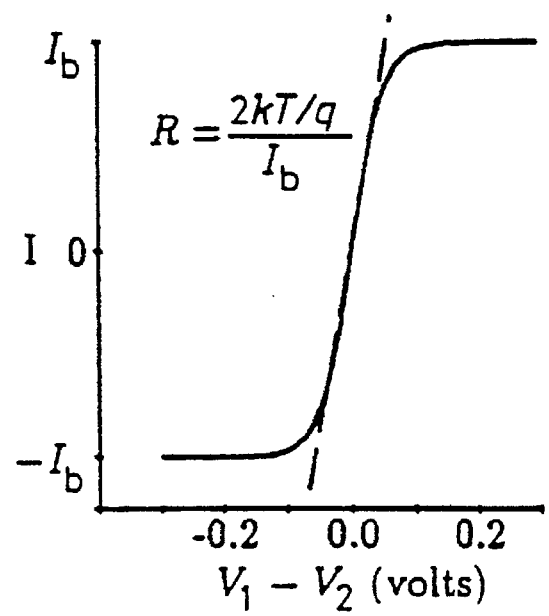

15A and 15B, respectively, for a gate voltage of 0.6 volts. The two curves are estimated for a transistor with channel length of a half micron whose Early voltage is about 2 volts and for a transistor with channel length of 3.5 microns whose Early voltage is about 50 volts [—Simulation];

FIGS. 16A–16C show a current mirror and associated transfer functions. The input current is plotted on the left graph, relative to the gate-source voltage of the input transistor, M1. The output current is plotted on the right graph for a particular input current, as a function of the drain-source voltage of the output transistor, M2. Transistor M2 has an Early voltage of 2 V, as in FIG. 15 [—Simulation];

FIGS. 17A 17B show a differential pair which compares two input voltages, $V^+$ and $V^-$, and splits a current, $I_b$, between the two branches, thereby generating currents $I^+$ and $I^-$;

FIGS. 17C and 17D show a differential pair as in FIGS. 17A and 17B, but wherein the input-voltage range of the central linear portion of the current/voltage relation is increased by adding diodes to the base of the differential pair [—Simulation];

FIGS. 18A–18D show schematic representations of normal (FIGS. 18A–B) and wide-input range (FIGS. 18C–D) transconductance amplifiers and associated transfer functions [—Simulation];

FIG. 19 shows a schematic diagram of a low pass filter and a transfer function of the transconductance amplifier showing the region of linear resistance [—Simulation];

FIGS. 20A–20C show a schematic diagram showing the response of the filter of FIG. 19 to a step input for two different filter time constants; and FIG. 21 shows a circuit diagram and input/output relation of a voltage-controlled resistor [—Simulation].

Although simulations were performed in order to generate illustrations, these circuits have all been fabricated and measured to perform close to theory.

1. BUILDING BLOCK PHILOSOPHY

The circuit modules described herein are a complete silicon construction set for building neuron analogs in CMOS VLSI. Specific applications of well-known circuits and also novel circuits are illustrated in the body of the text. Well-known circuits which are referred to in the text are described briefly in the "Simple Circuits" section at the end of the description.

The present approach to creating artificial neurons is unlike traditional engineering approaches because it is based on a physically motivated description of the neuron, rather than a functional one. Instead of explicitly implementing a pre-defined input/output relationship, the construction set allows an analog neuron to be assembled on the basis of measured biophysical properties of a real neuron, whose input/output function need never be known. The assembly process consists in combining circuit elements in one to one correspondence with the physical components of the neuron that the circuits represent. The input/output relationship of the analog neuron results from the concurrent dynamical activity of its coupled circuit modules, just as the input/output relationship of a real cell arises from the biophysical properties of its primitive elements.

2. COMPARTMENTS

The modelling approach of the present invention is similar to that used by biophysicists who attempt to unravel the relationship between the characteristics of individual components of a neuron and its overall behavior using mathematical simulation. As mentioned above, traditional simulations of neuronal biophysics represent the neuron as a finite number of discrete elements whose individual properties are known and expressed in a set of equations. The model neuron is divided into compartments that correspond roughly to physical slices of a real neuron. Each slice contains a number of materials such as: a tube of membrane that encloses the inside of the cell, some intracellular fluid, and some channels that cross through the cell memebrane and allow electrically charged ions in and out of the cell. The compartments are coupled to each other in the same pattern as the slices of the cell to which they correspond.

Figure 2:
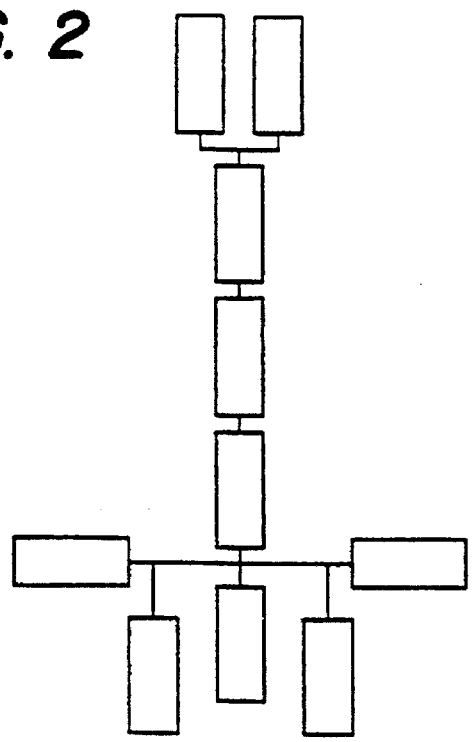
FIG. 2 shows the morphology of a neuron modelled by constructing a tree of compartments, each of which is electronically equivalent to a portion of the dendritic arborization of the cell.
Figure 3:
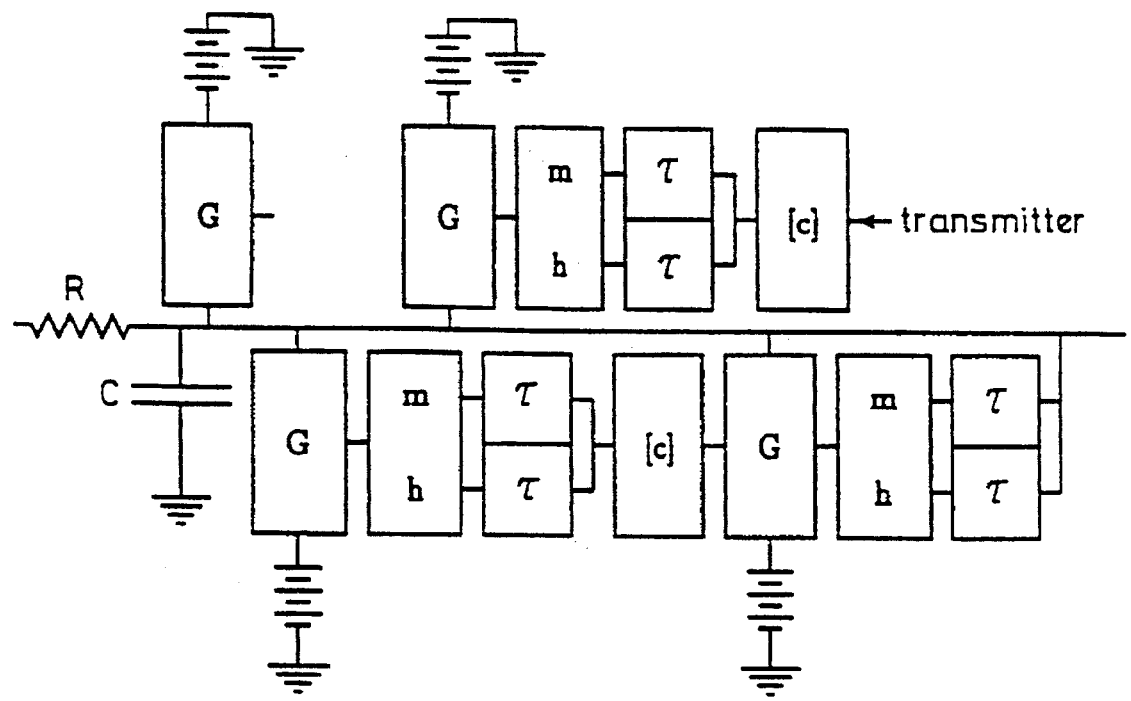
FIG. 3 shows a sample compartment, of the type shown in FIG. 2, which includes an axial resistor, a capacitor, a passive leak conductance and three types of active conductance, one voltage sensitive, one ligand (transmitter) sensitive and one ion-concentration sensitive.

To create an analog neuron, the circuits that eumulate the biophysical properties of membranes are combined into compartments and the compartments are connected to each other in a tree-like pattern that represents the neurons's morphology according to the standard cable approximations, as shown in FIG. 2. Each compartment contains: a capacitor C, which represents the capacitance of the patch of neuronal membrane associated with that compartment; a resistor R, which represents the axial resistance of the cable process; and a set of voltage-, ion-, or ligand-sensitive conductances, each of which represents a population of ion-permeable channels that span the nerve cell membrane. As in mathematical cable models of neurons, the morphology of the cell may be approximated by any number of compartments to varying degrees of accuracy. A representative compartment is shown in FIG. 3.

2.1 Passive Components

The foundation of the compartmental model is the passive, linear properties that are attributed to the biophysics of the cell membrane and the intracellular fluid. The capacitance of the cell membrane is naturally emulated in the analog by the intrinsic capacitances of the material. In an embodiment of the present invention, juxtaposed plates of first and second layer polysilicon make a linear capacitor with relatively large capacitance. The capacitance of this structure fabricated in the Orbit p-well double-poly process is typically 0.49 fF/$\mu m^2$. Electrical coupling between compartments is mediated by the flow of current in the intracellular fluid which is modeled as a linear resistor. In the analog circuit, the axial resistor between compartments is implemented using the resistor circuit described in Simple Circuits Section 5.6. The resistor has a limited linear response range, outside of which the current through the resistor saturates. The resistance in the linear range is controlled by an externally applied analog voltage and can be varied over orders of magnitude. In addition to the axial resistance, the mathematically ideal compartment contains a linear leakage conductance across the membrane that drives the membrane voltage to a quiescent resting potential. In the analog circuit, the leakage conductance is implemented with a wide-input range transconductance amplifier, which is described in Simple Circuits Section 5.4. This circuit also has a central linear range and saturating behaviour. The conductance in the linear range is controlled by an externally applied analog voltage and can be varied over orders of magnitude. These circuit elements approximate the traditional passive, linear model.

2.2 Active Components

One feature of a neuron that distinguishes it from a passive linear cable is the active channels that cross the membrane. The channels conduct ionic flow, and are said to be active because they open and close their conduction paths in response to local conditions, such as electrical polarization of the cell membrane or the concentration of various chemicals. The kinetics of opening and closing are determined by the intrisic properties of the particular channel type. The active conductances create non-linear electrical behaviour in the neuron.

The compartment of FIG. 3 features three different types of active-channel-population models. The components of each channel-population model are described in detail in the following sections. All channel-population models include a conducting element G. The magnitude of the conductance is controlled by an analog voltage, which, in the case of the active channels, is generated by an activation/inactivation element labelled (m h). This element represents the state of the channel population, the fraction of the population that is in the active or conducting state, and the fraction of the population that is in the inactive or non-conducting state. The kinetics of channel response are represented by the low-pass elements labelled $\tau$.

The state of the population is a function of some controlling variable. Each of the three activation/inactivation circuits is controlled by a different type of variable: the membrane voltage, or a voltage computed by an element [c] that represents the concentration of either a ligand or an ion. The ligand concentration circuit is used as a synapse. It calculates the time-varying transmitter concentration resulting from the activity of a presynaptic cell. The ionic concentration circuit usually represents calcium, which accumulates as a result of the opening Of a calcium-permeable voltage-sensitive conductance. This arrangement is indicated in the diagram by the membrane voltage-sensitive element G coupling into the [c] element.

Descriptions of conductance elements, concentration elements and activation elements are provided below. Each has several possible instantiations. The choice of which is appropriate depends on the properties of the particular channel being modelled.

2.2.1 Conductance Elements

The element G, illustrated in FIGS. 4A–4F, are is the simplest circuit, in some cases composed of only a single transistor. (The transistor is more fully described in Simple Circuits Section 5.1.) The conductance element G couples the membrane capacitor C to the battery representing the reversal potential $V_s$ of the ion/ions to which the channel is permeable. The magnitude of the conductance is modulated by the voltage $V_g$, generated by the activation/inactivation circuit (m h). Three different types, A, B, C, of conductance element are shown, namely excitatory, inhibitory and shunting respectively. Graphs of the current $I_{ds}$ through the conductance element G as a function of the voltage $V_d-V_s$ across the element are shown in FIGS. 4A–4F, for two or three values of $V_g$. The degree of the dependence of the current on the voltage across the transistor depends on transistor length. Longer transistors are more like current sources, producing a nearly constant current for large voltages across the transistor. The curves shown in FIGS. 4A–4F are for operation of the transistors in weak inversion, however, their behaviour does not change qualitatively in strong inversion, although they become somewhat more linear.

The excitatory and inhibitory conductance elements shown in FIGS. 4A and 4B are single transistors whose drains are connected to the membrane capacitor, $C_m$, and whose sources are connected to the reversal-potential battery $V_s$. If the voltage on $C_m$ crosses the reversal potential of the excitatory or inhibitory transistors, the direction of current flow reverses and its magnitude increases exponentially. Consequently, the single transistor conductance element should be used only for ions such as pottasium whose reversal is at the limit of the cell's expected operating range. For ions such as chloride, whose reversal potential is near the resting potential of the cell, a transconductance amplifier should be used.

The transconductance amplifer (see Simple Circuits Section 5.4) is used as a resistor when bi-directional conductance between the two terminals of the resistor is unnecessary. For example, when it is used as a shunting conductance element in the neuronal compartment, the $V^+$ input is tied to the reversal potential $V_s$ of the shunting ion, and the $V^-$ input is tied to the output, which is the membrane capacitor, $C_m$. The transconductance amplifier conducts current onto and off of the membrane capacitor symmetrically around the ion's reversal potential $V_s$. Unlike a true resistor, this current doesn't actually flow into the $V^+$ terminal; instead it flows into the power supply which is hidden from view. In this application, the linear portion of the current/voltage relation is the most important feature, since it is in this range that the transconductance amplifier approximates a true conductance. Source-degeneration diodes can be added to the base of the differential pair (see Simple Circuits Section 5.3 and FIGS. 17A through 17D) to extend the linear range. The linear range of such a transconductance amplifer is larger than the linear range of the voltage-controlled resistor.

2.2.2 Kinetics

Channel kinetics are very simply approximated by low-pass filters, which delay the response of the channel to the controlling variable. The low-pass filter, labelled $\tau$ in FIG. 3, is also constructed with a transconductance amplifer, which functions like a resistor to generate an RC time constant. The RC filter transforms an incoming voltage wave-form into a smoother output voltage wave form. The degree of smoothing depends on the time-constant of the filter. The time-constant can be varied over orders of magnitude by changing the transconductance of the amplifier. The circuit diagram of the low-pass filter is described and shown in Simple Circuits Section 5.5 and FIGS. 19 and 20 respectively.

2.2.3 Concentration Elements

Two variants of the concentration circuit, [c], are shown in FIGS. 5A and 5B. The concentration circuits are essentially low-pass filters, with time constants set by $\tau$. In the absence of input, the concentration decays to a resting level, which is determined by the voltage input to the positive side of the first low-pass filter. Charge representing molecules of the species whose concentration is being calculated are gated onto the capacitor, C, of the low-pass filter and decay away via the transconductance amplifier. The voltage on the capacitor C represents the concentration. This voltage is filtered again by low-pass filters before being applied to the activation/inactivation circuits (m h) of the concentration-sensitive conductance.

Concentration circuits are used to calculate concentration of neurotransmitter at a synapse and calcium concentration within the cell. To calculate the transmitter concentration at a synapse, charge is gated onto the capacitor C by the presynaptic action potentials applied to the gate of transistor Q1 (c.f. FIG. 5A). The amount of transmitter accumulated per action potential is determined by the duration of the action potential (assumed constant) and the voltage $\delta$ applied to the gate of transistor Q2. Thus the strength of the synapse (the charge deposited on the membrane capacitor in response to a presynaptic input) is controlled in part by $\delta$, in part by the time constants of the low-pass filters, and in part by the maximum conductance of the activation/inactivation circuit, and may be affected by the value of the membrane voltage itself.

The calcium concentration within the cell is, as mentioned above, also calculated by a concentration circuit. The source of calcium is a calcium conductance circuit, which, like other ionic conductances, allows ions to flow into the main body of the compartment to affect the electrical properties of the cell. Charge flows onto capacitor C to model ion concentration, just as it flows onto the membrane capacitance, $C_m$, to model electrical activity. However, the amount of charge entering the concentration circuit is scaled independently of the current into the cell, in order to maintain indepedent control of the concentration. The scaling factor is applied to the source of transistor Q3 (c.f. FIG. 5B). The same procedure can be used to model the concentration of any ion type in the neuron model. The concentration can be modelled independently in each compartment, or the concentration capacitors in adjoining compartments may be resistively coupled to create a continuous distribution of ion concentration. This process essentially creates another morphological neuron model, which, instead of calculating the electrical behaviour of the neuron, computes the chemical state of the neuron. Each ion concentration model needs an independent morphological neuron to calculate the concentration.

2.2.4 Activation Elements

The central circuit of an ion conductance model according to the present invention is the activation/inactivation circuit (m h). Two examples of such a circuit are shown in FIG. 6. In both examples, the activation m and inactivation h halves of the circuit comprise differential pairs of CMOS transistors. The current through the m leg of the activation differential pair represents the degree of activation of the channel population, while the current through the h leg of the inactivation differential pair represents the degree of inactivation.

In the circuit shown in FIG. 6A, the degree of activation and the degree of inactivation are multiplied by placing the differential pairs in series. The current available for activation is steered by the inactivation differential pair. As inactivation proceeds, less and less of the gmax bias current flows through the activation differential pair. A multiplicative design is favoured over the subtractive design of FIG. 6B if the power constraints on the circuit are very tight. The activation current m is fed into a current-mirror diode (see Simple Circuits Section 5.2), which is appropriately configured to control a conductance G. The conductance G injects current into the cell membrane capacitor.

In the circuit depicted in FIG. 6B the degree of inactivation, h, is subtracted from the degree of activation, m, in order to compute the final conductance. The h current of the inactivation transconductance amplifier and the m output current of the activation amplifier are summed into a current-mirror diode. The current-mirror diode half-wave rectifies the result of the subtraction, so that no matter what the values of m and h, the value of the conductance is never negative. (A half-wave rectifier circuit is described in Chapter 6 of *Analog VLSI and Neural Systems* by Carver Mead, published by Addison-Wesley, 1989.) Silicon neurons according to the present invention preferably use a subtractive, rather than a multiplicative, activation/inactivation circuit. This is because the subtractive version of the activation/inactivation circuit has one more free parameter than the multiplicative circuit and can be used to supply a partial inactivation if $m_{sat}$ is larger than $h_{sat}$.

Unlike the maximum conductances, which are voltage-regulated parameters, the steepnesses of the activation and inactivation functions are determined at the time of fabrication. The steepness of the function is controlled by the efficacy with which the gate voltages on the differential pair steer current. Current through a transistor cannot change more quickly than a factor of e every 25 mV voltage change on the gate and typically goes a factor of e every 40 mV. This limitation is a result of the physics of the Boltzman distributed electrons trying to cross an energy barrier that is controlled by gate voltage. In the biological system, the gating charges of the channels also obey a Boltzman distribution, but if n gating charges are moved through the membrane per channel opening, then the voltage on the membrane need only change one nth as much as the voltage on the transistor gate for the same number of channels to open. For this reason, the voltage range of the silicon neuron is scaled to be n/x ( where x is the efficacy of a gate charge in a CMOS transistor; n/x is typically $\approx 10$) times larger than the voltage range of a real neuron. By scaling the voltage range, the degree of activation of the channel population as a fraction of the neuron's operating range is conserved.

By modifying the activation/inactivation circuits slightly, the sharpness of their responses can be changed. A shallow-pitched response can be obtained by adding source-degeneration diodes into the activation/inactivation differential pairs. The activation/inactivation circuit in FIG. 6B, which has no source-degeneration, has a moderately steep response because the tail of the current through the differential pair is long. If a sharper onset is desired, then full transconductance amplifiers may be substituted for the differential pairs. The use of a full transconductance amplifier generates a steep activation/inactivation function.

Although the activation/inactivation circuit can be characterized by its static input/output relation, the functioning of all of the conductances is essentially dynamic. The example of action potential generation illustrates how these circuits perform in operation.

3. THE ACTION POTENTIAL

The action potential was characterized in the squid giant axon by Hodgkin and Huxley (mentioned above). They separated the current that flows during the action potential into two components, the sodium current and the potassium current (c.f. FIG. 7, which shows the time course of events at one point in an axon during the passing of an action potential). The action potential is triggered by a depolarization (increase) of the membrane voltage caused by an external source. As the membrane voltage increases, the sodium current is activated and flows into the cell, further increasing the potential on the membrane capacitance. Eventually the sodium current disappears, due to the delayed inactivation of the sodium channels. The potassium current is also activated by the membrane depolarization, but with a slower time constant. The potassium current out of the cell discharges the the membrane capacitance. The potassium current stops when the membrane voltage falls below the level for its activation. The repolarization of the membrane allows the sodium channel to deinactivate, so that it is ready to generate another action potential.

When the action potential cycle of conductance change is completed, the cell either returns to rest or begins to depolarize again if the external current is still present. At high spike rates, the frequency of action potential generation depends on the magnitude of the external current relative to the potassium current as a function of time. When the input current exceeds the potassium current, the membrane depolarizes and another action potential begins. Ultimately, the occurence of action potentials is limited by the requirement that the membrane must hyperpolarize long enough for the sodium channel to deinactivate. If the input current is large enough to permanently depolarize the membrane so that deinactivation cannot occur, the action potential generation mechanism fails.

3.1 Circuits in Action

The action potential in the silicon neuron is generated the same way as in the biological neuron. A block diagram of a simple silicon neuron with membrane capacitor, leakage conductance, voltage-sensitive sodium conductance and voltage-sensitive potassium conductance is shown in FIG. 8. The detailed activation/inactivation circuits are shown in FIG. 9 and FIG. 10. The sodium activation/inactivation circuit of FIG. 9 is composed of two transconductance amplifiers $A_1$, $A_2$ and a diode connected transistor. The potassium activation/inactivation circuit of FIG. 10, in contrast, has only one differential pair DP, since this channel does not inactivate. The kinetics of opening and closing of the sodium and potassium channels are controlled by the low-pass filters $\tau_1$, $\tau_2$ feeding the activation/inactivation circuits. The membrane voltage, and delayed membrane voltages controlling all of the activation/inactivation differential pairs, and the resulting currents are shown in FIG. 11. The kinetics and scaled magnitudes of the currents giving rise to the action potential in the biological neuron are replicated by the concurrent dynamical interaction of the circuit modules.

Two different embodiments of activation/inactivation circuit are shown in FIGS. 12 and 13.

With reference to FIG. 12, two differential pairs of CMOS transistors TR6, TR7, TR8, TR9 are included, one differential pair TR6, TR7 controlling the sodium activation potential and the other differential pair TR8, TR9 controlling the sodium inactivation potential. In this embodiment, the inactivation signal NAH is low-pass filtered before acting as a gate voltage for transistor TR9. Gate voltage NAOFFKNEE for transistor TR8 sets the inactivation threshold which, if overcome by inactivation signal NAH, results in an inactivation output N. Activation output M from the other differential pair TR6, TR7 is combined with inactivation output N to yield a conductance control voltage NAVG. A transistor TR10 controlled by NAVG permits current INA to flow between the sodium reversal potential ENA and the membrane potential VM.

In FIG. 13, a CMOS circuit that emulates potassium currents IKD of action potential comprises a differential pair of CMOS transistors TR1 and TR2. The output M from the differential pair represents potassium activation, and is transformed into a gate voltage KDVG via a current mirror CM. The 'short' transistor TR4 controlled by KDVG drains potassium current IKD between the membrane potential (or cell body) and the potassium reversal potential EK. The time-dependence of the potassium conductance activation is achieved by using a follower-integrator to low-pass filter the membrane voltage.

The voltage response of the silicon neuron scales linearly with that of the real neuron. The overall CMOS circuit is driven by a five volt power supply (VDD), but the voltage excursion of the silicon neuron is only between 1.5 V and 3.0 V. These limits correspond to the equilibrium potentials that were set for sodium (EK) and potassium (ENA) respectively. In actual biological neurons, EK≈−100 mV and ENA≈+50 mV, and the range is 150 mV, or one tenth of the silicon neuron. The difference in scale is due to a difference in gating charge of the channels mediating conductance. When a CMOS transistor operates in its subthreshold regime the drain current (I) is exponential in the gate-source voltage ($V_{gs}$), and given by the formula;

$$I \alpha I_o e^{q z V_g / kT}$$

CMOS field-effect transistors have a gating charge Z≈0.65 and require an increase of about 40 mV in the voltage gradient ($V_{gs}$) per e-fold increase in current (I). The same relationship occurs for the flow of ion current through the voltage-dependent conductances of biological membranes, but in this case Z≈6. As a result, transmembrane current increases e-fold for every 4 mV of voltage gradient. Thus, the biological membrane is about ten times more sensitive to voltage gradient than the CMOS transistor.

The concentrations of various ions may affect the dynamics of the membrane conductance to other ions. One example is calcium, which can affect the conductance of the membrane to potassium ions, and is used to slow down the discharge of action potentials in the face of a constant stimulus. In a biological neuron, during each action potential calcium enters the cell via voltage sensitive calcium channels. The calcium is quickly buffered. However, if the discharge rate is high the entering calcium cannot be buffered sufficiently and the intracellular calcium concentration raises, activating a potassium current IAHP. This current opposes the excitatory current, causing spike frequency adaptation. In this example analog circuit according to the present invention, each action potential places a small amount of charge on a leaky integrator whose output voltage represents the calcium concentration. It is this voltage that controls IAHP.

As will be appreciated from the foregoing, an integrated circuit according to the present invention emulates the characteristics of the biological system directly in its device physics, rather than by modelling a mathematical abstraction. This permits a great efficiency in circuit construction. For example, the circuits that generate the action potential together contain fewer elements than a single operational amplifier. The analog circuits are also compact. The entire prototype silicon neuron occupies less than 0.1 mm². The power dissipation of the whole circuit, including instrumentation amplifiers, is only 60 µW, which compares favourably with 500 mW dissipation of a typical operational amplifier.

The structural and functional details of single silicon neurons, and the number of such neurons, can be increased using the building blocks described above. The type of integrated circuit described herein covers less than 10% of a 2.2×2.5 mm² chip. Much of this area is occupied by the large capacitors required for the relatively slow biological time-constants. In principle, the silicon neuron could operate about a million times faster than its biological counterpart. However, it is important that the dynamics of the biological and silicon neurons be well matched, because the silicon neurons may be used in devices that interact with the same real-world events that biological nervous systems do.

4. EMERGENT TRANSFER FUNCTION

The various circuit modules that have been described are completely compatible, and can be easily combined to create any desired type of neuron. For example, circuit modules emulating the low-threshold calcium current, the calcium-dependent potassium current and the potassium A-current have been added to the sodium and potassium spike currents to create a neuron whose electrophysiology and temporal pattern of action-potential discharge mimicks that of a cortical pyramidal cell in in vitro current injection experiments (c.f. FIGS. 14A–14D). With reference to FIGS.

Figure 14A:
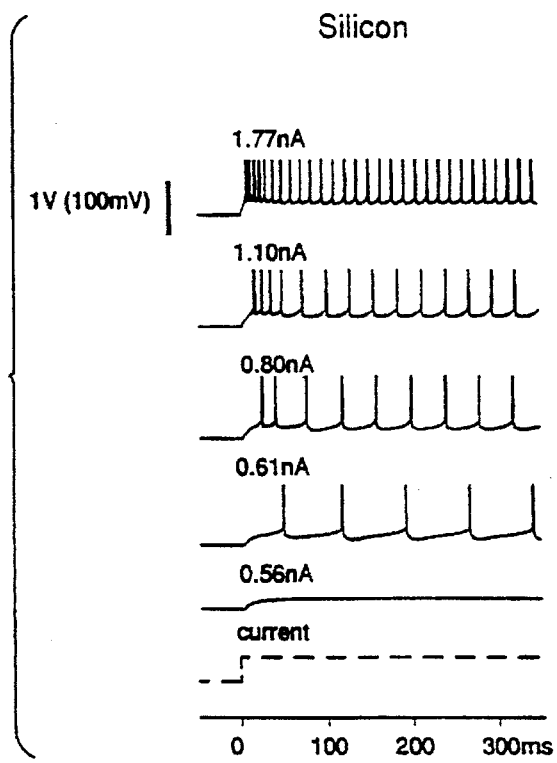
Figure 14B:
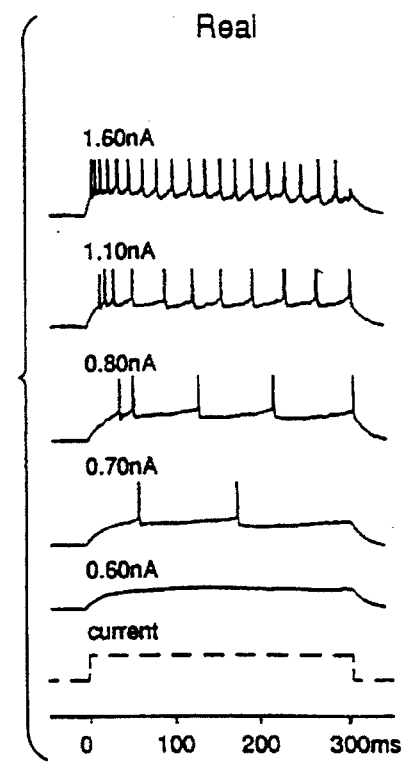
Figure 14C:
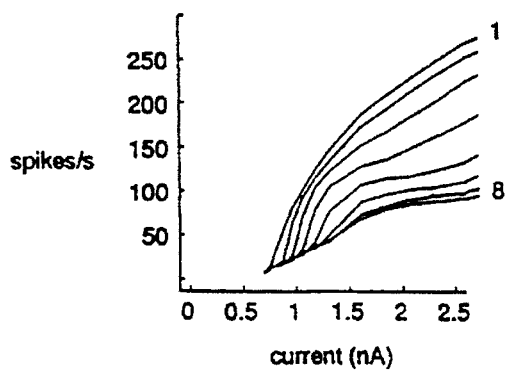
Figure 14D:
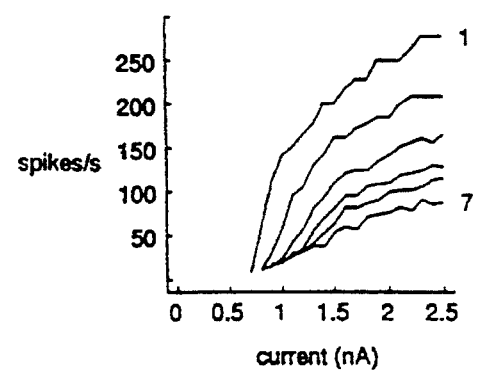

14A–14D, the output of an integrated circuit according to the present invention is compared with the output of an in vitro neocortical neuron recorded in cat visual cortex. As can be seen, a number of different current inputs were tested and the outputs produced by the silicon analog and the real neuron were recorded. At low current inputs, no neural discharges were recorded, but as the current input was increased, the frequency of discharge spikes increased accordingly. Furthermore, and more importantly, the output from the silicon neuron according to the present invention (c.f. FIG. 14A) emulated very closely the output of the real neocortical neuron (c.f. FIG. 14B). Indeed, adaptation could be seen in both types of neuron, which is something not achieved in any prior art autonomous device.

The parameters to the circuit modules of this aforementioned silicon neuron can be adjusted to emulate different types of cortical neurons and also neurons from other regions of the nervous system. If additional properties are required, another silicon neuron with different morphology and different types of channels can be fabricated using the similar circuit modules.

5. SIMPLE CIRCUITS

The circuits summarized in this section have been fully described in Analog VLSI and Neural Systems by Carver Mead, published by Addison-Wesley, 1989. The input/output relations for the transitor, the current mirror, the differential pair, the transconductance amplifier, the low-pass filter and the resistor are summarized here without explanation.

5.1 The Transistor

The transistor is described in chapters 2 and 3, as well as in Simple Circuits Section 5B, of *Analog VLSI and Neural Systems*. The transistor is an active three-terminal device. Current flows between the source and the drain of the transistor under the modulatory control of the gate. In the Complimentary Metal-Oxide-Semiconductor (CMOS) technology, transistors come in two types, N-type and P-type. The current flows from a source of positive potential in a P-type transistor and into a source of negative potential in an N-type transistor, shown in FIGS. 15A–15F. In an N-type transistor operating in the subthreshold regime, the current through the channel between the drain and the source is an exponential function of the voltage difference between the gate and the source and a non-linear saturating function of the voltage difference between the drain and the source. The equation for current flow between the drain and the source is:

$$I_{DS} = I_0 e^{\kappa V_G - V_S}\left(1 - e^{-(V_D - V_S)} + \frac{(V_D - V_S)}{V_0}\right)$$

where all voltages are in units of the thermal voltage, kT/q. The variable k is a fabrication-process-dependent parameter approximately equal to 0.7. It measures the efficacy with which charges placed on the gate change the Boltzman energy barrier to current flow. This parameter is analogous to the gating charge of the channel through the nerve membrane, n, which we assume to have a value of 7. The variable $V_o$ is a geometry-dependent parameter called the Early voltage. It reflects the extent to which the transistor behaves as a current source. Transistors with long channels have large Early voltages of about 50 volts, while transistors with short channels may have Early voltages as low as 2 volts. Calculations of circuit transfer functions often assume that the transistor is in saturation, so that $e^{-(V_D - V_S)} \approx 0$, and that the Early effect is negligible, either because the Early voltage is large or because the drain-source voltage is nearly constant. In this case, the transistor is an effective current source. The expression for the current through the transistor depends only on gate voltage if the source voltage is fixed:

$$I_{SAT} = I_0 e^{\kappa V_G - V_S}$$

5.2 The Current Mirror

Current mirror circuits are described in chapter 3 of Analog VLSI and Neural Systems. The current mirror (c.f. FIGS. 16A–16C) are two transistor circuit that receives a current input and produces a current output that is inverted relative to the input current. The input transistor is a diode connected transistor M1 that transforms an input current $I_{in}$ into a voltage, $V_b$. The exponential dependence on gate voltage of the current through the diode-connected input transistor determines the gate-source voltage and thus also its drain-source voltage. If $V_b$ is applied to another transistor M2 that is identical in every way (including the drain-source voltage) to M1, then the current out of M2 is the same as the current into M1. Changing the conditions of M2 relative to M1 allow the generated current to be modified. The equation for current flow through a transistor is used to estimate the scaling between input current and output current. For example, if M2 is very short, the Early voltage of M2 is small and $I_{out}$ will have a strong dependence on the drain-source voltage of M2. If the source potential of M2 is different from that of M1, then $I_{out}$ will be multiplied by a constant factor, $e^{V_{s1} - V_{s2}}$ in the subthreshold regime of transistor operation. Mirrors can be made either of N-fets or P-fets depending on the sign of the desired input and output currents.

5.3 The Differential Pair The differential pair (c.f. FIGS. 17A, 17B and FIGS. 17C, 17D) is described in chapter 5 of *Analog VLSI and Neural Systems*. The differential pair is a pair of transistors with a common source. A third bias transistor supplies current to the differential pair. The bias current limits the total current that can flow through the differential pair transistors. The voltage on the common source of the differential pair follows the larger of the input voltages so that the total current flowing through the differential pair does not exceed the bias current. These constraints can be mathematically expressed, using the relationship for the current through a transistor in saturation (see above). They are:

$$I_1 = I_0 e^{\kappa V_1 - V}$$

$$I_2 = I_0 e^{\kappa V_2 - V}$$

$$I_b = I_1 + I_2 = I_0 e^{-V}(e^{\kappa V_1} + e^{\kappa V_2}).$$

These equations can be solved for the common source voltage V to yield expressions for the currents $I_1$ and $I_2$:

$$I_1 = I_b \frac{e^{\kappa V_1}}{e^{\kappa V_1} + e^{\kappa V_2}}$$

and $$I_2 = I_b \frac{e^{\kappa V_2}}{e^{\kappa V_1} + e^{\kappa V_2}}$$

The voltage input range for which the output is linear can be extended using source-degeneration diodes. The currents $I_1$ and $I_2$ in this case are given by:

$$I_1 = I_b \frac{e^{\frac{\kappa^2}{\kappa+1} V_1}}{e^{\frac{\kappa^2}{\kappa+1} V_1} + e^{\frac{\kappa^2}{\kappa+1} V_2}}$$

and $$I_2 = I_b \frac{e^{\frac{\kappa^2}{\kappa+1} V_2}}{e^{\frac{\kappa^2}{\kappa+1} V_1} + e^{\frac{\kappa^2}{\kappa+1} V_2}}$$

5.4 The Transconductance Amplifier

The transconductance amplifier (c.f. FIGS. 18A to 18D) has been described in chapter 5 of *Analog VLSI and Neural Systems*. The transconductance amplifer is a differential pair whose branch currents, $I^+$ and $I^-$, have been subtracted by means of a current mirror. The output current $I_{out}$ is the difference between $I^+$ and $I^-$. The equation for the output current of a normal transconductance amplifier is:

$$I_{out} = I_b \tanh\left(\frac{\kappa(V_1 - V_2)}{2}\right)$$

The equation for the output current from a wide-input range transconductance amplifier is:

$$I_{out} = I_b \tanh\left(\frac{\frac{\kappa^2}{\kappa+1}(V_1 - V_2)}{2}\right).$$

5.5 The Low-Pass Filter

The low-pass filter (c.f. FIGS. 19 and 20A–20C) has been described extensively in chapter 9 of *Analog VLSI and Neural Systems*. The transconductance amplifier is connected to a capacitor, C, to form a low-pass filter. The amplifier, with its output tied to its negative input, behaves like a resistor from the point of view of the capacitor. The resistance of the amplifier is determined by the voltage $V_b$. The time constant, $\tau$, of the filter is the product of the resistance of the amplifier and the capacitance, $\tau = RC$. The equation for the time-evolution of the output of the filter to an input step is:

$$V_{out} = V_{in}(1 - e^{-t/\tau})$$

The range of voltage over which the transconductance amplifier behaves linearly is roughly ±0.25 volts. Voltage steps larger than this range cause the amplifier to transiently slow-rate limit, so the temporal response is slower than that predicted by a linear model.

5.6 The Resistor

The resistor has been described in chapter 7 of *Analog VLSI and Neural Systems*. The resistor circuit and its current-to-voltage relation are shown in FIG. 21. The resistor is linear in the center of its range. The magnitude of the resistance can be cotrolled by application of an analog potential $V_g$ which generates a current $I_b$ in the resistor bias circuit. The equation for the current through the resistor as a function of the voltage $(V_1-V_2)$ is:

$$I = I_b \tanh\left(\frac{V_1 - V_2}{2}\right)$$

In the linear range, the resistance is:

$$R = \frac{2kT/q}{I_b}$$

It will of course be understood that the present invention has been described above purely by way of example, and that modifications of detail can be made within the scope of the invention.

We claim:

1. An integrated circuit comprising a plurality of differential pairs of CMOS transistors, the gate voltage of a first one of each pair of transistors being settable to set a threshold value corresponding to an activation threshold of an ion channel in a biological neuron and the gate voltage of the second one of each pair of transistors being representative of an incoming membrane potential, ligand concentration or ion concentration of a biological neuron, each differential pair of CMOS transistors thereby providing a sigmoidal output representative of an ionic conductance across a neural membrane when the gate voltage of the second transistor exceeds the threshold value set by the gate voltage of the first transistor, wherein the plurality of differential pairs of CMOS transistors are interdependent and produce a combined output which emulates the functional characteristics of a biological neuron.

2. An integrated circuit as claimed in claim 1, wherein the maximum sigmoidal output of a differential pair is dictated by the gate voltage of a third, bias, transistor between the differential pair and a reference voltage.

3. An integrated circuit as claimed in claim 1, wherein the output from each differential pair is used to control current flow representative of a particular ion current between a voltage representative of the membrane voltage and a voltage representative of the ionic reversal potential.

4. An integrated circuit as claimed in claim 3, wherein the output is transformed into a gate potential for a transistor via a current mirror.

5. An integrated circuit as claimed in claim 3, wherein the output is transformed into a gate potential for a transistor which is used to control the transconductance of an amplifier whose output is connected to its negative input, which is the membrane voltage, and whose positive input is connected to the ion reversal potential.

6. An integrated circuit as claimed in claim 1, wherein any incoming control voltage, representing membrane potential, ion concentration or ligand concentration, passes through a low-pass filter to control the dynamics of conductance control outputs from the or each differential pair.

7. An integrated circuit as claimed in claim 6, wherein the low-pass filter comprises a CMOS differential pair, a current mirror and a capacitor.

8. An integrated circuit as claimed in claim 1, comprising one or more differential pair of CMOS transistors for producing an output representative of inactivation of an ion channel in a biological neuron.

9. An integrated circuit as claimed in claim 8, wherein the outputs of the activation and inactivation differential pairs of CMOS transistors are combined to provide a drive potential for producing an action potential discharge.

10. An integrated circuit as claimed in claim 9, wherein the action potential discharges are adapted or patterned.

11. An integrated circuit as claimed in claim 1, wherein the gate voltages are set to simulate the conductance activation and inactivation associated with sodium, potassium or calcium ions in a biological neuron.

12. An integrated circuit comprising a plurality of integrated circuits according to claim 1.

13. An integrated circuit as claimed in claim 1 that emulates the functional characteristics of a biological neuron in real time or faster.

14. An integrated circuit as claimed in claim 1, fabricated using 2 μm CMOS.

15. A single silicon chip, comprising a plurality of integrated circuits according to claim 1.

16. A chip as claimed in claim 15, wherein the plurality of integrated circuits emulate a plurality of interacting biological neurons.

* * * * *

UNITED STATES PATENT AND TRADEMARK OFFICE
CERTIFICATE OF CORRECTION

PATENT NO. : 5,648,926
DATED : July 15, 1997
INVENTOR(S) : Rodney J. DOUGLAS et al.

It is certified that error appears in the above-identified patent and that said Letters Patent is hereby corrected as shown below:

On the title page item [73], Assignee, delete "Medical Research Council, London, England" and insert -- Eidgenössische Technische Hochschule Zürich, Zurich, Switzerland--.

Signed and Sealed this

Fourteenth Day of September, 1999

Attest:

Q. TODD DICKINSON

*Attesting Officer*     *Acting Commissioner of Patents and Trademarks*